(12) United States Patent
Delfosse et al.

(10) Patent No.: US 11,494,684 B2
(45) Date of Patent: Nov. 8, 2022

(54) SHORT-DEPTH SYNDROME EXTRACTION CIRCUITS FOR CALDERBANK SHOR STEANE (CSS) STABILIZER CODES

(71) Applicant: Microsoft Technology Licensing, LLC, Redmond, WA (US)

(72) Inventors: Nicolas Guillaume Delfosse, Bellevue, WA (US); Maxime Tremblay, Sherbrooke (CA); Michael Edward Beverland, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/219,383

(22) Filed: Mar. 31, 2021

(65) Prior Publication Data
US 2022/0198312 A1 Jun. 23, 2022

Related U.S. Application Data

(60) Provisional application No. 63/130,115, filed on Dec. 23, 2020.

(51) Int. Cl.
*G06N 10/00* (2022.01)
*G06F 11/10* (2006.01)
*G06F 11/00* (2006.01)
*G06F 16/901* (2019.01)

(52) U.S. Cl.
CPC ......... *G06N 10/00* (2019.01); *G06F 11/1044* (2013.01); *G06F 11/1048* (2013.01); *G06F 16/9024* (2019.01)

(58) Field of Classification Search
CPC .. G06N 10/00; G06F 16/9024; G06F 11/1048
See application file for complete search history.

(56) References Cited

U.S. PATENT DOCUMENTS

| | | | |
|---|---|---|---|
| 9,286,154 B2 * | 3/2016 | Ashikhmin | ........ H03M 13/1148 |
| 9,762,262 B2 * | 9/2017 | Ashikhmin | ....... H03M 13/6362 |
| 2022/0198311 A1 | 6/2022 | Delfosse et al. | |

OTHER PUBLICATIONS

Arute, et al., "Quantum Approximate Optimization of Non-Planar Graph Problems on a Planar Superconducting Processor", In Repository of arXiv:2004.04197v2, Jul. 10, 2020, 19 Pages.
(Continued)

*Primary Examiner* — Justin R Knapp
(74) *Attorney, Agent, or Firm* — Holzer Patel Drennan

(57) ABSTRACT

A disclosed methodology for syndrome extraction in a quantum measurement circuit includes generating a graph representing a code implemented by the quantum measurement circuit. The graph includes bit nodes corresponding to data qubits in the quantum measurement circuit, check nodes corresponding to syndrome qubits in the quantum measurement circuit, and edges between the bit nodes and check nodes that are each associated with a stabilizer measurement provided by the code. The methodology provides for assigning each of the different edges in the graph to a select one of "G" number of different edge types and performing at least G-number of temporally-separated rounds of qubit operations that each enact concurrent multi-qubit operations on endpoints of a subset of the edges assigned to a same one of the G different edge types.

20 Claims, 13 Drawing Sheets

(56) References Cited

OTHER PUBLICATIONS

Cross, et al., "A Comparative Code Study for Quantum Fault-Tolerance", In Repository of arXiv:0711.1556v1, Nov. 9, 2007, 33 Pages.
Daraeizadeh, et al., "Scalable Realization of Surface Code Quantum Memory by Applying Multi-Qubit Parity Detector Gates", In Repository of arXiv:1811.09011v1, Nov. 22, 2018, 36 Pages.
Li, et al., "A Numerical Study of Bravyi-Bacon-Shor and Subsystem Hypergraph Product Codes", In Repository of arXiv:2002.06257v1, Feb. 14, 2020, 13 Pages.
"International Search Report and Written Opinion Issued in PCT Application No. PCT/US2021/043278", dated Jan. 14, 2022, 13 Pages.
"International Search Report and Written Opinion Issued in PCT Application No. PCT/US2021/043283", dated Dec. 3, 2021, 13 Pages.
Tillich, et al., "Quantum LDPC Codes With Positive Rate and Minimum Distance Proportional to the Square Root of the Blocklength", In Proceedings of IEEE Transactions on Information Theory, vol. 60, Issue: 2, Feb. 2014, pp. 1193-1202.

\* cited by examiner

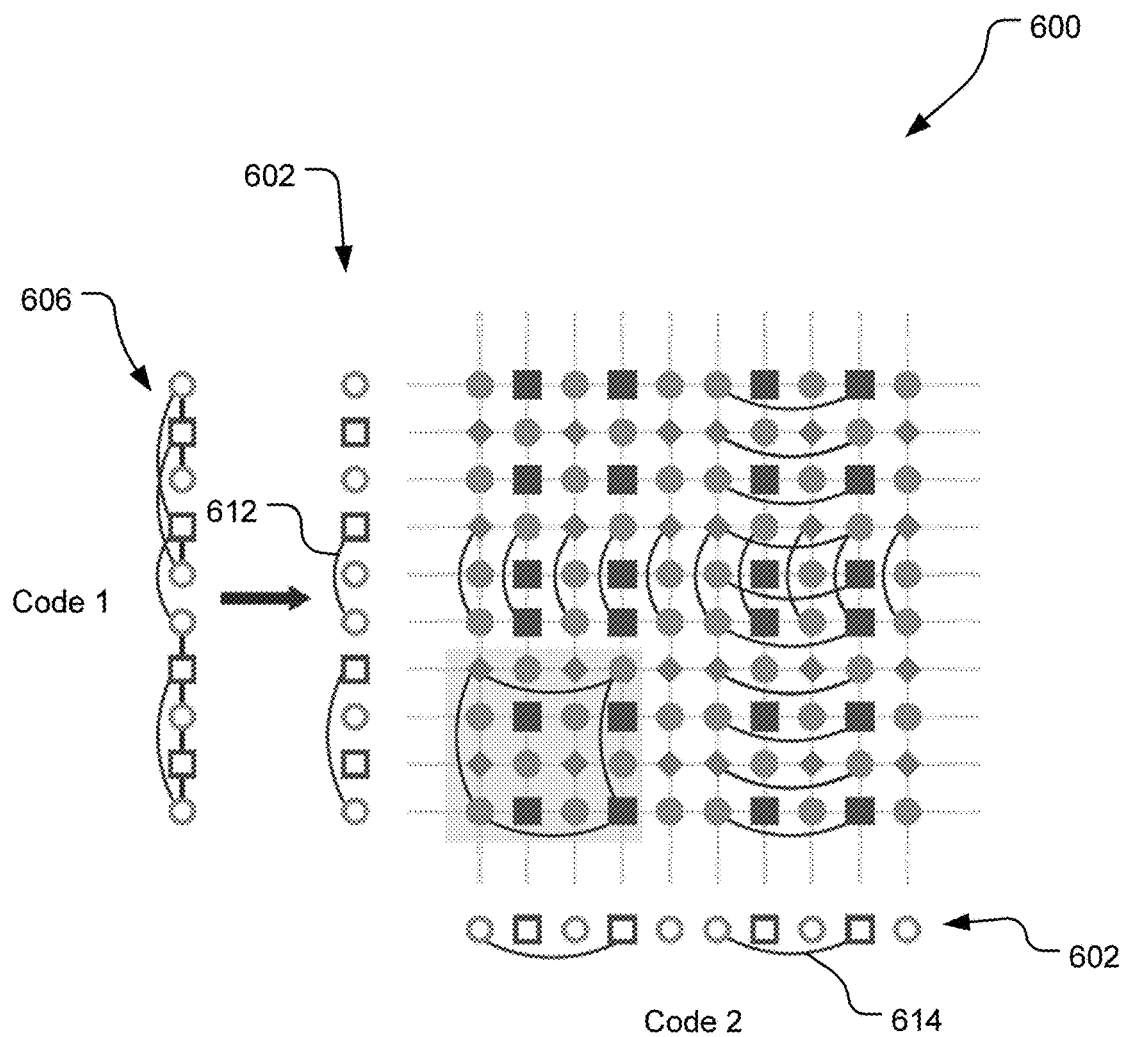
FIG. 6
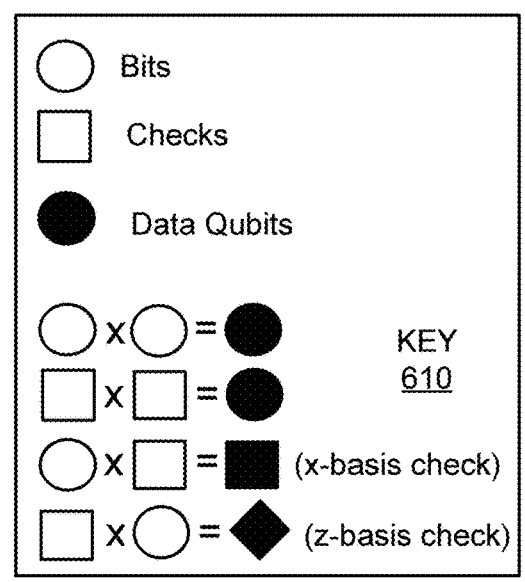

SHORT-DEPTH SYNDROME EXTRACTION CIRCUITS FOR CALDERBANK SHOR STEANE (CSS) STABILIZER CODES

CROSS-REFERENCE TO RELATED APPLICATIONS

The present application claims priority to U.S. provisional application No. 63/130,115, entitled "Short-Depth Syndrome Extraction Circuits for Quantum Codes," and filed on Dec. 23, 2020, which is hereby incorporated by reference for all that it discloses or teaches.

BACKGROUND

The scalability of decoders for quantum error correction is an ongoing challenge in generating practical quantum computing devices. Hundreds or thousands of high-quality qubits with a very low error rate (e.g., $10^{-10}$ or lower) may be needed to implement quantum algorithms with industrial applications. Using current quantum technologies, these specifications cannot be met without using thousands of high-quality qubits that are each individually encoded in thousands of physical qubits such that there may exist millions of qubits running each computation of the quantum computer. Obtaining error rates currently required by industrial applications requires correcting, at regular intervals, errors that accumulate over these millions of qubits. Detecting and correcting these errors entails processing a massive amount of data, leading to significant challenges in bandwidth and hardware resource allocation.

Calderbank Shor Steane (CSS) stabilizer codes are a special type of code constructed from classical codes with some special properties. Low-Density Parity-Check (LDPC) codes area one class of CSS codes that show promising results and could significantly reduce the overhead required for fault-tolerant quantum computation. However, as the error correction code capability increases along with code depth, so too typically does the processing time for measuring error syndromes. More efficient mechanisms for quantum LDPC code implementation are sought.

SUMMARY

According to one implementation, a method for extracting a syndrome from a quantum measurement circuit includes generating a graph representing a CSS code implemented by the quantum measurement circuit, where the graph includes bit nodes corresponding to data qubits in the quantum measurement circuit, check nodes corresponding to syndrome qubits in the quantum measurement circuit, and edges between the bit nodes and check nodes that are each associated with a stabilizer measurement provided by the code. The method further provides for assigning each of the different edges in the graph to a select one of "G" number of different edge types and performing at least G-number of temporally-separated rounds of qubit operations that each enact concurrent multi-qubit operations on endpoints of a subset of the edges assigned to a same one of the G different edge types. This methodology allows the syndrome to be extracted with a constant depth circuit regardless of the particular CSS code employed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTION OF THE DRAWINGS

FIG. 6 illustrates an exemplary construction of a product graph representing an HPG code formed by multiplying together two linear CSS codes.

DETAILED DESCRIPTION

The herein disclosed technology proposes a short-depth syndrome extraction circuit for measuring error affecting quantum measurements in circuits that implement CSS codes. Measuring error in quantum circuits may entail what is referred to as "syndrome extraction" or the measurement of an array of qubits that provide information about the location of faults (qubit errors) that have occurred during quantum computations. Syndrome extraction is performed via a mechanism known as the "syndrome extraction circuit," which refers to a sequence of quantum operations (e.g., gates or joint parity measurements) that are collectively effective to extract the syndrome. Using currently available syndrome extraction circuits, the "depth" of the syndrome extraction circuit—e.g., the number of time-separated quantum operations or groups of such operations requisite to extract a syndrome—typically grows in proportion to the correction power of the particular error correction code employed. There herein disclosed technology provides a novel syndrome extraction methodology that works for any CSS code and that uses a smaller number of rounds of qubit operations than other existing approaches.

Figure 1:
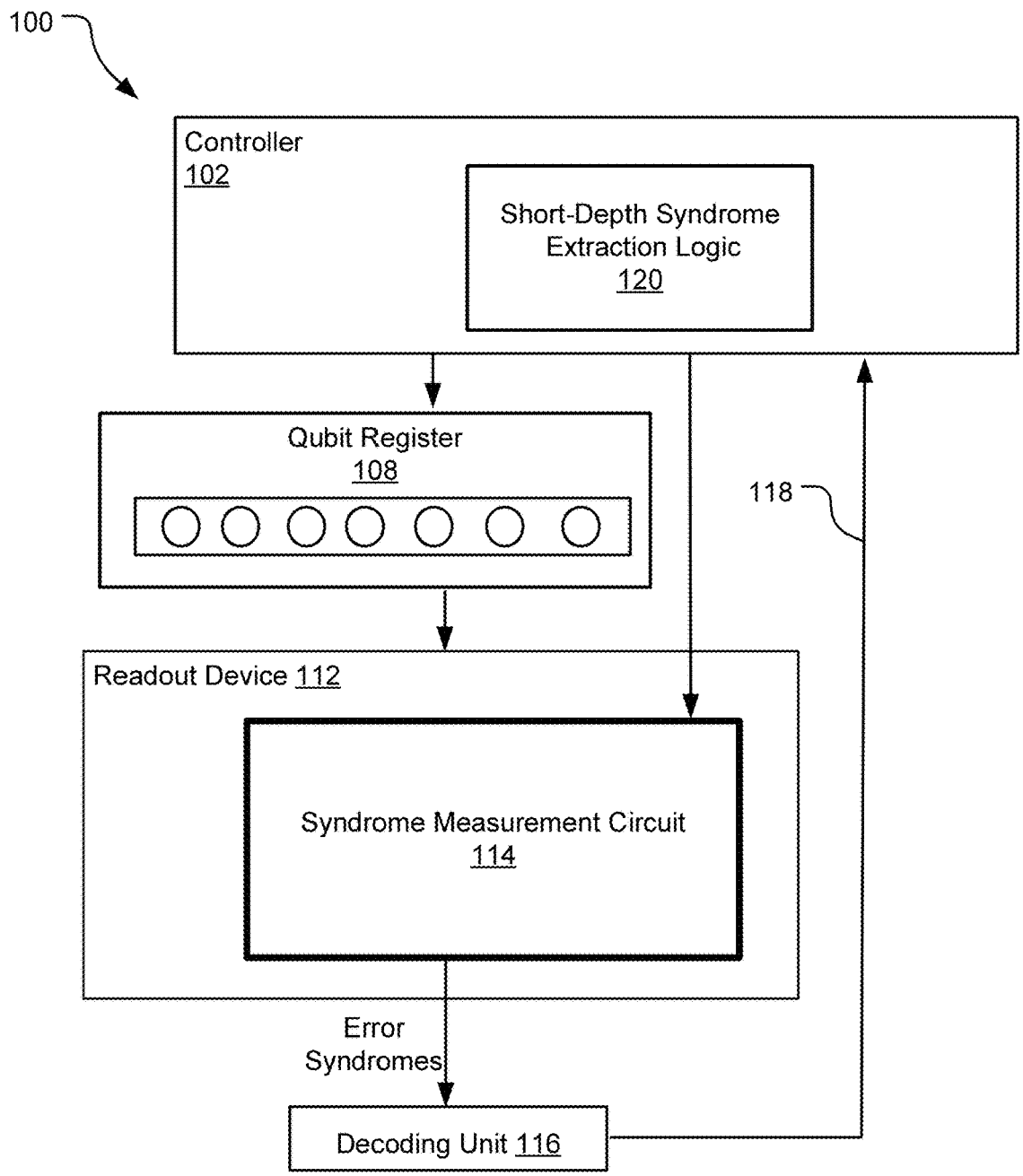
FIG. 1 illustrates an example quantum computing system that implements a short-depth syndrome extraction circuit that is of a constant depth for any CSS stabilizer code.

FIG. 1 illustrates an example quantum computing system 100 that implements a short-depth syndrome extraction circuit that is of constant depth for any CSS stabilizer code. The quantum computing system 100 includes a controller 102 that performs calculations by manipulating qubits within a qubit register 108. The controller 102 includes logic for executing quantum algorithms via such manipulations and for controlling a readout device 112 to extract information about the locations of faults (errors) affecting qubit states during quantum measurements. Specifically, the controller 102 includes short-depth syndrome extraction logic 120 for generating control signals to command the readout device 112 to repeatedly extract an error syndrome (array of bits and zeros) by implementing a syndrome measurement circuit 114 within the readout device 112.

The syndrome measurement circuit 114 enables fault-tolerant quantum computing by applying a stabilizer code to the qubits in the qubit register 108. Since measurement is known to destroy the delicate states of a qubit needed for computation, the syndrome measurement circuit 114 uses redundant qubits—known as "ancilla data bits" to perform computations. During quantum processing, entropy from the data qubits that encode the protected data is transferred to the ancilla qubits that can be discarded. The ancilla qubits are positioned to interact with data qubits such that it is possible to detect errors by measuring the ancilla qubits and to correct such errors using a decoding unit 116 that includes one or more decoders. In some implementations, the decoding unit 116 includes logic executed by one or more classical computing systems.

The syndrome measurement circuit 114 performs measurements of the ancilla bits in the quantum computer to extract syndromes providing information measured with respect to errors (faults). In order to avoid accumulation of errors during the quantum computation, the syndrome data is constantly measured, producing r syndrome bits for each syndrome measurement round. In one implementation, the syndrome data is measured with a frequency of every 1 μs. Other implementations may measure the syndrome more frequently, such as every 1 ns.

The repeatedly-measured syndrome data is used to identify and track locations of faults that occur throughout a quantum operation that spans several individual qubit manipulations. At the termination of the quantum operation, the measurement circuit performs a final measurement that disentangles one qubit from the others in the syndrome measurement circuit 114, and this qubit is read out as a final solution (a 1 or 0 value). By using the syndrome data to track faults in each round of the quantum operation, a classical bit correction can be performed to correct the final solution.

The syndrome measurement circuit 114 extracts each round of the syndrome data by performing sequences of operations known as "stabilizer measurements." In the case of CSS codes, stabilizer measurements are typically implemented with a particular defined sequence of operations. For example, a CSS code stabilizer may be measured by entangling an ancilla qubit with a group of data qubits and by subsequently measuring the ancilla qubit to observe the resulting state. This entanglement forces the group of neighbor data qubits into an eigenstate of a stabilizer operator (e.g., the X-stabilizer or the Z-stabilizer), allowing one to measure the stabilizers without perturbing the system. When the stabilizer measurement outcomes change, this corresponds to one or more qubit errors in the quantum state that are projected by the measurement. The outcome is either 0 (trivial) or 1. If the outcome of a measurement is 1, this indicates the presence of an error on the data qubits measured. An ancilla qubit that supports a stabilizer measurement in this way is also referred to herein as a "check qubit."

CSS code stabilizer measurements typically entail several time-separated measurement steps, such as those exemplary steps disclosed herein with respect to FIG. 3 below. Traditional solutions typically provide for performing a different, time-separated stabilizer measurement with respect to each check bit within each stabilizer measurement round. For a robust CSS code employing a large number of stabilizers, this results in a syndrome measurement circuit of considerable depth (long temporal length to implement).

In contrast to these traditional larger-depth stabilizer circuits, the syndrome measurements circuit 114 implements what is referred to herein as a "short-depth" syndrome extraction circuit, meaning that the syndrome measurement circuit 114 can extract each round of syndrome data from the CSS code using a fewer number of time-separated measurement steps that traditional solutions. According to one implementation, the syndrome measurement circuit 114 implements a stabilizer measurement that is mathematically proven to be of minimal depth and also to work for any CSS code.

At each round of syndrome measurement, the syndrome data is sent to the decoding unit 116, which implements decoding algorithms to analyze the syndrome data and to detect the location of each error and to correct each error on the data qubits.

In decoding applications, a "connectivity graph" $G=(Q, E)$ may be used to specify the hardware layout without the qubit register 108, where each vertex $q \in Q$ corresponds to a qubit. In the presently-disclosed applications, it is assumed that the selected quantum architecture allows for implementation of any Clifford gate, Pauli state preparation, and Pauli measurement on each individual qubit $q \in Q$. It is further assumed that some entangling operation, such as a CNOT gate or a joint measurement, is possible between a pair of qubits q and q' if and only if they are connected by an edge in the graph, i.e., $\{q, q'\} \in E$. In this work, the case considered is one where there exist quantum architectures and corresponding graphs with highly connected qubits. "Highly connected" implies that each individual qubit is directly connected to a large number, such as a majority, of qubits in a qubit grid. In contrast, local connectivity restricts multi-qubit operations to pairs of nearest neighbor qubits.

This means that a quantum operation can be performed on any set of qubits in the qubit register 108 without performing interim entanglement operations to establish/entanglement between lines of qubits.

To implement a stabilizer code of block length N in the proposed hardware, more than just N physical qubits are employed. Rather, the code state is stored in a subset of N of the qubits in the connectivity graph, which are referred to herein as data qubits. In contrast to data qubits, the above-mentioned "ancilla qubits" make up a second set of physical qubits that are used to measure the value of the stabilizers. Ancillas used to measure X-type errors are referred to herein as "X-type check qubits" while ancillas used to measure Z-type errors are referred to herein as "Z-type check qubits."

To implement logic for measuring stabilizers, it is often useful to consider a specific mapping of a type of graph known as the Tanner graph of a code to physical qubits in the connectivity graph using coordinates. An exemplary Tanner is graph is discussed below with respect to FIG. 2.

Figure 2:
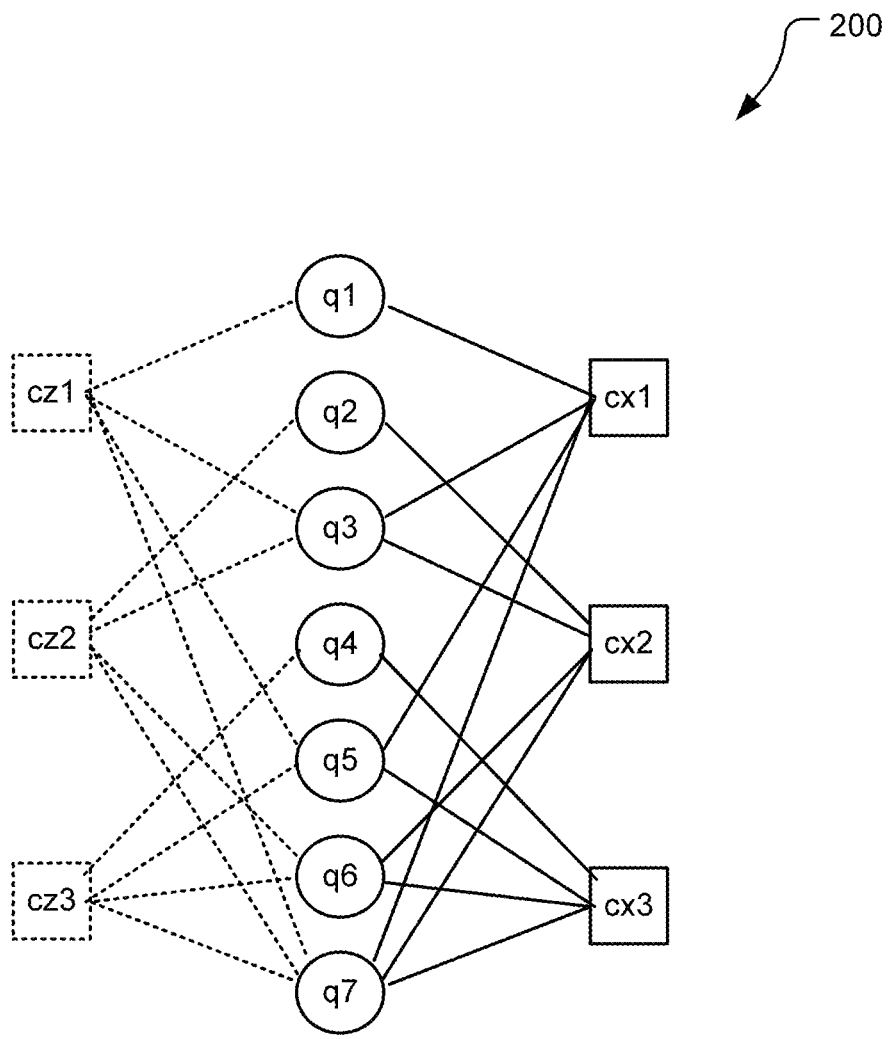
FIG. 2 illustrates an Tanner graph useful in illustrating error decoding principles for a quantum circuit implementing a CSS stabilizer code.

FIG. 2 illustrates an Tanner graph 200 useful in illustrating error decoding principles for a quantum circuit implementing a CSS stabilizer code. The quantum circuit is said to have a connectivity graph (representing qubit connectivity) with coordinates that correspond to the Tanner graph 200 such that each vertex in the Tanner graph 200 may be understood as corresponding to a qubit at a particular coordinate in the connectivity graph. This assignment of coordinates to the vertices of the Tanner graph 200 is sometimes referred to as "standard coordinates."

The Tanner graph 200 is exemplary of one of many different types of CSS stabilizer codes suitable for implementing the herein disclosed short-depth syndrome extraction methodology. In this example, the particular code illustrated by the Tanner graph 200 is a Steane code that includes check qubits represented by squares, data qubits represented by circles, and connections therebetween represented by edges. Since an actual implementation of the syndrome measurement circuit may include more than 15,000 qubits, the Tanner graph of FIG. 2 is representative of a small portion of the circuit that includes seven data qubits, three X-basis check qubits (cx1, cx2, cx3) and three Z-basis check qubits (cz1, cz2, cz3). The herein disclosed methodologies for measurement of an X-basis syndrome are the same or similar to the disclosed methodologies for measuring the Z-basis syndrome. For this reason, the following example describes a stabilizer measurement with respect to only an X-basis check qubit.

Measurement of a stabilizer is performed by executing a syndrome extraction circuit, which may be understood as decomposed into a sequence of steps $S_0, S_1, \ldots S_{r-1}$. A step consists of a set of operations allowed by the connectivity graph where each operation in the set has disjoint support and therefore can be implemented simultaneously. In general, two or more qubit operations may be performed on a single step (simultaneously) provided the two operations do not occur on a same edge of the associated connectivity graph (or Tanner graph, which has edges mirroring those of the circuit's connectivity graph). The size of a syndrome extraction circuit is the total number of operations (including idle operations within the circuit), while the depth of syndrome extraction circuit referred to the number of time steps T required to implement the circuit.

Measuring an X-basis syndrome of the portion of the circuit represented by the Tanner graph 200 entails (1) preparation of the X-basis check qubits in a known state; (2) operations to entangle each one of the X-basis check qubits with the neighboring data qubits to which the X-basis check qubit is connected by edges in the Tanner graph 200; and (3) measuring each of the X-basis qubits following these entanglement operations. Performing the above-enumerated operations with respect to the three X-basis check qubits (cx1, cx2, and cx3) is equivalent to measuring three stabilizers (executing three stabilizer circuits) to extract a 3-bit syndrome, where a 0 bit indicates an absence of fault or an even-number of faults on the neighboring data qubits and a 1 bit indicates an odd number of faults on the neighboring data qubits. Complete syndrome extraction typically entails repeating the above-described operations with respect to the Z-basis check qubits.

Figure 3:
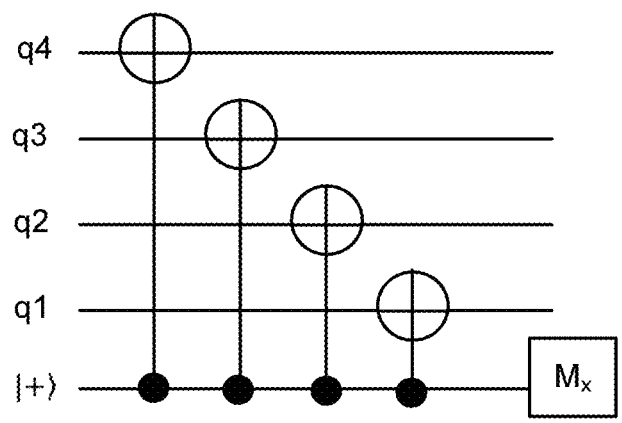
FIG. 3 illustrates an example traditional methodology for measuring an individual stabilizer in a quantum circuit implementing a CSS stabilizer code.

FIG. 3 illustrates an example traditional methodology 300 for measuring an individual stabilizer in a quantum circuit implementing a CSS stabilizer code. As noted above, extraction of a round of syndrome data entails performing a different stabilizer measurement with respect to each different X-basis and Z-basis check qubit in the measurement circuit.

In some implementations, a stabilizer supported on a set of qubits can be measured by using a single measurement ancilla qubit. FIG. 3 illustrates a specific example of this, whereby a CSS code stabilizer measurement is performed by entangling a check qubit with its four nearest-neighbor qubits and by the observing the resulting state of the check qubit. Traditionally, this stabilizer measurement is performed by implementing a sequence of operations in a very particular order. This sequence of operations includes preparing the ancilla (the check qubit) by initializing this qubit ground state; performing four sequential (time-separated) CNOT operations, where the CNOTs target the four nearest-neighbor data qubits with the check qubit acting as the control; and finally, performing a projective measurement of the resulting eigenstate ($\hat{X}_a, \hat{X}_b, \hat{X}_c, \hat{X}_d$) by measuring the check qubit. This single individual stabilizer measurement consists of 6 sequential measurements. Each stabilizer within the CSS code is measured independently.

To measure the syndrome of the three X-basis check qubits shown in FIG. 2 (above), this process entails 18 total time-separated measurement steps (e.g., 6 steps for each one of the three stabilizer measurements). Notably, this methodology provides for a number of measurement steps that is proportional to the number of check qubits in a given circuit.

Notably, the CNOT-based stabilizer readout strategy requires the ability to perform a CNOT between the measurement ancilla qubit and each data qubit in the support of the operator. However, this may not be possible depending on the connectivity graph corresponding to the particular quantum hardware employed. Another strategy for implementing a stabilizer measurement is therefore to use extra ancillas in addition to the readout ancilla qubit to help with the measurement using a cat state circuit. Since the herein-contemplated solutions consider quantum architectures with full qubit connectivity, these architectures relying on the cat state circuit for stabilizer measurement are considered external to the scope of this disclosure.

The methodology discussed below with respect to the following figures considers syndrome extraction circuits for CSS codes in the setting of fully connected qubits using CNOT-based stabilizer readout.

Figure 4A:
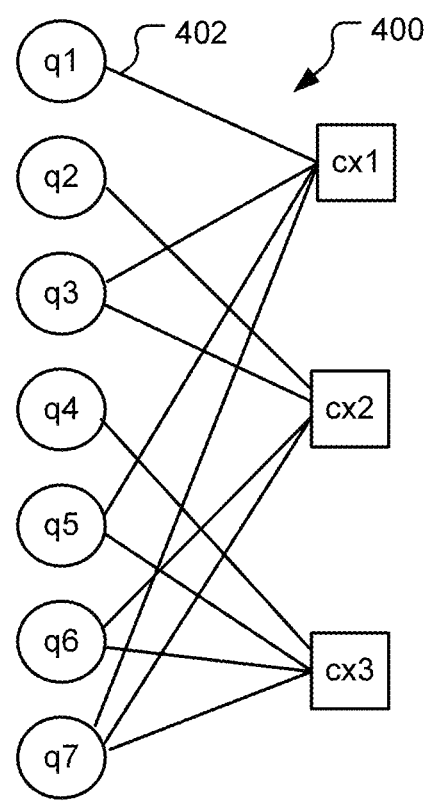
FIG. 4A illustrates an exemplary Tanner graph useful for illustrating principles of syndrome extraction.
Figure 4B:
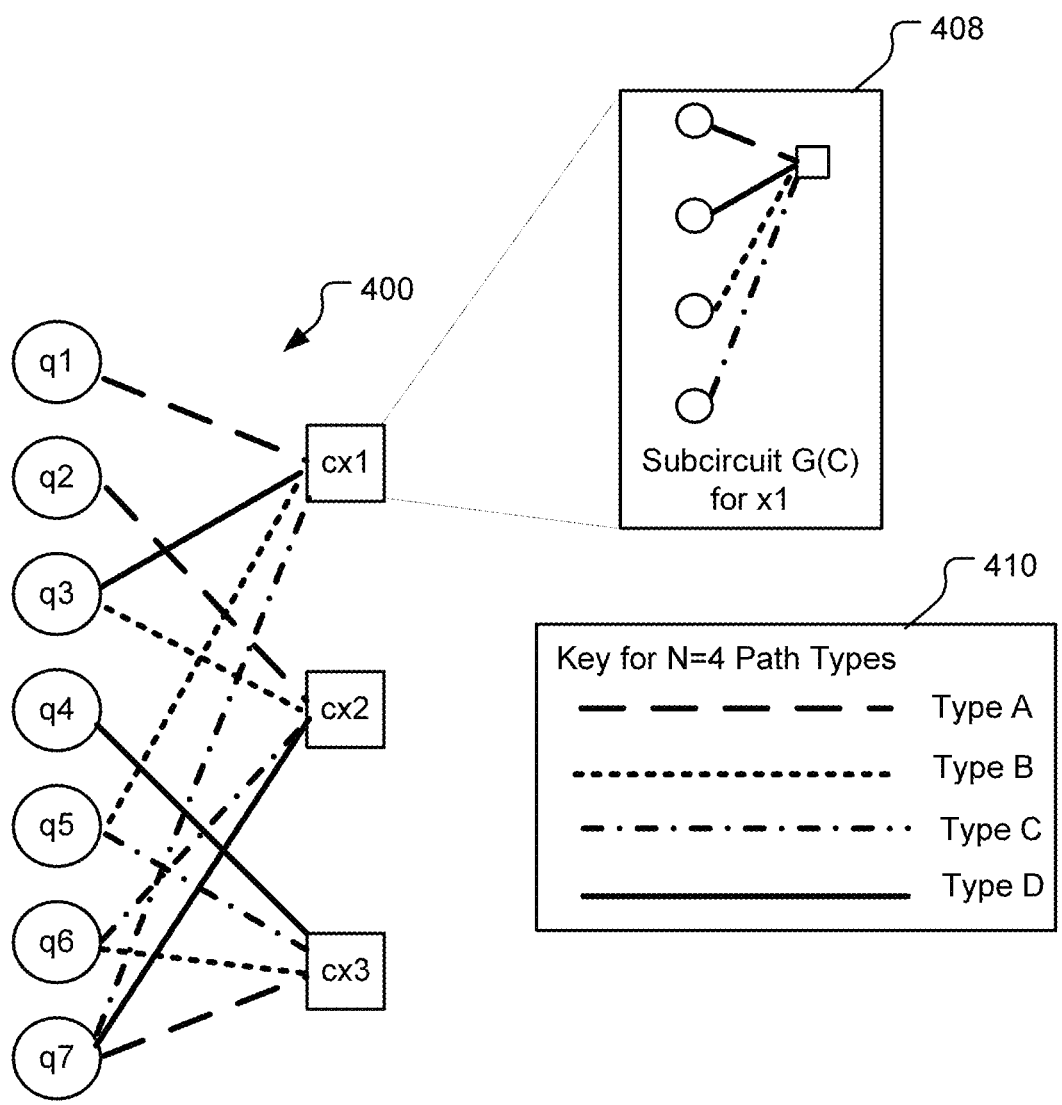
FIG. 4B illustrates exemplary aspects of a circuit compression methodology that can be applied to the Tanner graph of FIG. 4A to yield a short-depth syndrome extraction circuit.

FIG. 4A illustrates an exemplary Tanner graph 400 for implementing a short-depth syndrome extraction circuit that improves upon the methodology discussed above with respect to FIG. 3. Operations discussed below with respect to both of FIGS. 4A and 4B provide syndrome extraction for any CSS code according to a mathematically-guaranteed, shortest possible total number of measurement operations (e.g., the syndrome measurement circuit is of optimal depth).

FIG. 4A illustrates a Tanner graph 400 implementing an example CSS code, known as the Steane code, where the data bits and ancilla bits of the syndrome measurement circuit are represented by corresponding nodes in the Tanner graphs 502, 504. Specifically, the Tanner graphs 502, 504 include data bit nodes (q1-q7) representing the data qubits, check nodes (cx1, cx2, cx3) representing ancilla qubits used to implement the X-basis stabilizer measurement (also referred to herein as X-basis check qubits), and edges between representing qubit connectivity supported by the quantum hardware that is utilized in the execution of a syndrome extraction circuit.

To specify the operations of the syndrome extraction circuit, each operation can be labeled by an integer corresponding to a time step at which it is applied. According to one implementation, the herein disclosed short-depth syndrome extraction circuit for CSS codes is a CNOT circuit composed of state preparations, single-qubit measurements, and CNOT gates.

In particular, the syndrome circuit acts on data qubits and ancilla (readout) qubits which respectively correspond to the data bit nodes (q1-q7) representing the data qubits, check nodes (cx1, cx2, and cx3) in the Tanner graph 400. For each check node (cx1, cx2, cx3) there exists a corresponding preparation and a measurement operation that occurs in the short-depth syndrome measurement circuit. For each edge (e.g., an edge 402) in the Tanner graph 400, there is a CNOT in the short-depth syndrome measurement circuit between the qubits corresponding to the nodes connected by the edge (e.g., the data qubit corresponding to q1 and the check qubit correspond to cx1). According to one implementation, a syndrome extraction circuit can be implemented described below (1-3), which is the same or similar to methods discussed above with respect to FIG. 2-3. Following this is a discussion of a transformation that effectively shortens the depth of the syndrome extraction circuit.

A sequential syndrome extraction circuit corresponding to the layout of the Tanner graph 400 can be implemented in the following steps:
1. Prepare check qubits (corresponding to cx1, cx2, cx3) in the appropriate state during the 0 time step;
2. Taking each of the check qubits one at a time, apply its associated CNOT gates sequentially leading to each CNOT being applied during a different time step in $\{1, 2, \ldots \tau-1\}$ (e.g., for check qubit cx1, CNOT gates are applied on q1, q3, q5, q6 during 4 different sequential timesteps); and
3. Measure all check qubits in the appropriate basis during the final timestep $\{\tau\}$. Notably, this methodology provides for sequential application of the CNOT gates on each of the check qubits. For example, step (2) above would provide for preparation of the cx1 CNOTs, then for preparation of the cx2 CNOTs, then for preparation of the cx3 CNOTs (note: this could be achieved in any order for cx1, cx2, cx3).

Below, discussed with respect to FIG. 4B, is a first circuit transformation that effectively compresses the preparations and measurements of the check qubits in every syndrome measurement applied, for any CSS code implemented by a quantum architecture. For example, step 2 in the above could apply the sequence of four CNOTs on cx1, cx2, and cx3, simultaneously rather than one at a time (resulting in four time-steps instead of twelve).

FIG. 4B illustrates aspects of a circuit compression methodology that can be applied to the Tanner graph 400 of FIG. 4A to yield a short-depth syndrome extraction circuit. Although the disclosed methodology can be applied in any fully-connected qubit architecture implementing a CSS code, FIG. 4B illustrates the same Tanner graph 400 that is described above with respect to FIG. 4A.

Given a syndrome extraction circuit such as that described above with respect to FIG. 4A, an equivalent circuit is obtained by performing a modification that temporally compresses the syndrome extraction process described above with respect to FIG. 4. Specifically, this methodology entails a relabeling of the commuting CNOTs. The only logical restriction on such relabeling is that two CNOTs with overlapping support are not to be applied during the same time step. Stated differently, it is not permissible to simultaneously perform multiple CNOT operations that act on a same qubit. For example, it is not permissible to simultaneously implement a CNOT on {q1, cx1} and {q3, cx1} because both affect the state of cx1.

To obtain a minimum-depth circuit satisfying the above constraint, a subgraph structure is considered—referred to herein as an adjacency graph G(C) 408. Each qubit in the adjacency graph 408 corresponds to a vertex in G(C) and each CNOT in this subcircuit corresponds to an edge in G(C) between the pair of vertices associated with the qubits that it is applied on. The ordering of the CNOTs performed with respect to an individual check qubit (e.g., cx1) is referred to herein as an "edge coloring scheme." The terms "edge coloring" and "edge type" are used interchangeably herein to refer to an assignment that is given to each edge that dictates the time step in which the associated edge CNOT is to be applied.

In a given edge coloring scheme, a "color" is assigned to each edge such that no two edges connected to a same check node (vertices cx1, cx2 or cx3) have the same color. Since the figures are shown in black and white, these color assignments are also referred to herein as "edge types" and are depicted by lines of different styles rather than of different color, as shown in key 410. Thus, the terms "edge type" and "edge color" are intended to mean the same thing and are used interchangeably throughout.

The chromatic number of a graph is the minimum number of colors required to obtain an edge coloring. For bipartite graphs, it is well known that the chromatic number is equal to the maximum degree of the graph and there exist efficient algorithms to compute edge colorings.

Using a coloring scheme illustrated in FIG. 4B, the syndrome extraction circuit for the Tanner graph 400 can be compressed (time-wise) to allow for some simultaneous CNOT operations on different check bits without altering the circuit outcome. Specifically, the syndrome extraction circuit described with respect to FIG. 4A (e.g., measuring each stabilizer, one at a time) is equivalent to one in which CNOTs of the different stabilizer circuits for the different check qubits are simultaneously applied on edges assigned to the same color (edge type) during the same time step. This general concept is formally stated below as Circuit Transformation 1 and is referred to periodically throughout the remainder of this disclosure:

Circuit Transformation 1: Given a subcircuit C consisting only of pairwise commuting CNOTs and a coloring of the adjacency graph G(C), an equivalent circuit is obtained by applying all those CNOTs which correspond to edges with the same color during the same time step.

To implement an improved short-depth syndrome extraction circuit utilizing Circuit Transformation 1 (above), a classical controller initially determines the number of "G" different edge types to assign to the various edges within the quantum circuit, where "G" represents a maximum number of edges abutting any individual node of the Tanner graph 400 implementing the CSS code on which the syndrome extraction circuit is to be implemented. In the Tanner graph 400 of FIG. 4B, each check node has four edges, so there are four different edge types (Type A, B, C, and D) in the selected coloring scheme. Each edge is assigned to an edge type according to one simple rule: no two edges of a same edge type may connect to the same check qubit.

After the paths are assigned, the x-syndrome of the data qubits can be computed per the following operations. First, ancilla qubits (check bits) are prepared in the $|+\rangle$ state. This preparation of all ancillas is performed in a same time step (e.g., time step 0).

Then, for each of the next G different time steps, a set of operations is performed at each time on a different one of the edge types. In the example of FIG. 4A, the forgoing is implemented by performing a first set of CNOT operations simultaneously (e.g., at time step 1) on all Type A path segments. By example and without limitation, this first set of CNOT operations comprises: (1) a CNOT targeting q1 with cx1 acting as the control; (2) a CNOT targeting q2 with cx2 acting as the control; and (3) a CNOT targeting q7 with cx3 used as the control. Here, these three CNOT operations are performed in a single time step (simultaneously).

Following the operations on Type A path segments, a second set of CNOT operations is next performed simultaneously (e.g., at time step 2) on all Type B segments. This second set of simultaneous CNOT operations comprises: (1) a CNOT targeting q5 with cx1 acting as the control; (2) a CNOT targeting q3 with cx2 acting as the control; and (3) a CNOT targeting q6 with cx3 acting as the control.

Following the above operations, a third set of simultaneous CNOT operations is next performed (e.g., at time step 3). This third set includes: (1) a CNOT targeting q7 with cx1 acting as the control; (2) a CNOT targeting q6 with cx2 acting as the control; and (3) a CNOT targeting q5 with cx3 acting as the control.

Finally, a fourth and final set of simultaneous CNOT operations is performed. This fourth set includes (1) a CNOT targeting q3 with cx1 acting as the control; (2) a CNOT targeting q7 with cx2 acting as the control; and (3) a CNOT targeting q4 with cx3 acting as the control.

After a set of CNOT operations is performed for each of the G different edge types, a final measurement step is performed to measure all the ancillas (check bits), in which the syndrome is read from the check bits.

Regardless of the size of the syndrome measurement circuit, the above sequence of operations guarantees that the syndrome can be measured, in either the X-basis or the Z-basis, in a constant depth consisting of 2+G steps, where G is again the number of edge types (colors in the coloring scheme) as described above. In the above example where G=4, the X-basis or Z-basis syndrome can be read from the entire syndrome measurement circuit (e.g., from all the check bits) in 6 total measurements steps In contrast, the traditional methodology described above with respect to FIG. 2 leads to 18 total measurement steps when used to measure the syndrome of the same graph (the Tanner graph 400).

The above-proposed constant-depth syndrome extraction circuit design is obtained from a pair of sequential syndrome extraction circuits, one for the X stabilizer generators and one for the Z stabilizer generator. Thus, X stabilizers are measured simultaneously and Z stabilizers are measured simultaneously but independent of the X stabilizers. This circuit construction can be applied to any CSS stabilizer code.

Another circuit design disclosed below with respect to FIG. 5-7B adapts the above-disclosed edge coloring methodology to further reduce the depth of the syndrome extraction circuit in quantum devices that implement a type of code known as hypergraph product codes (HPGs). This additional reduction in circuit length is achieved via a methodology that permits simultaneous measurement of the X stabilizers and the Z stabilizers.

Figure 5:
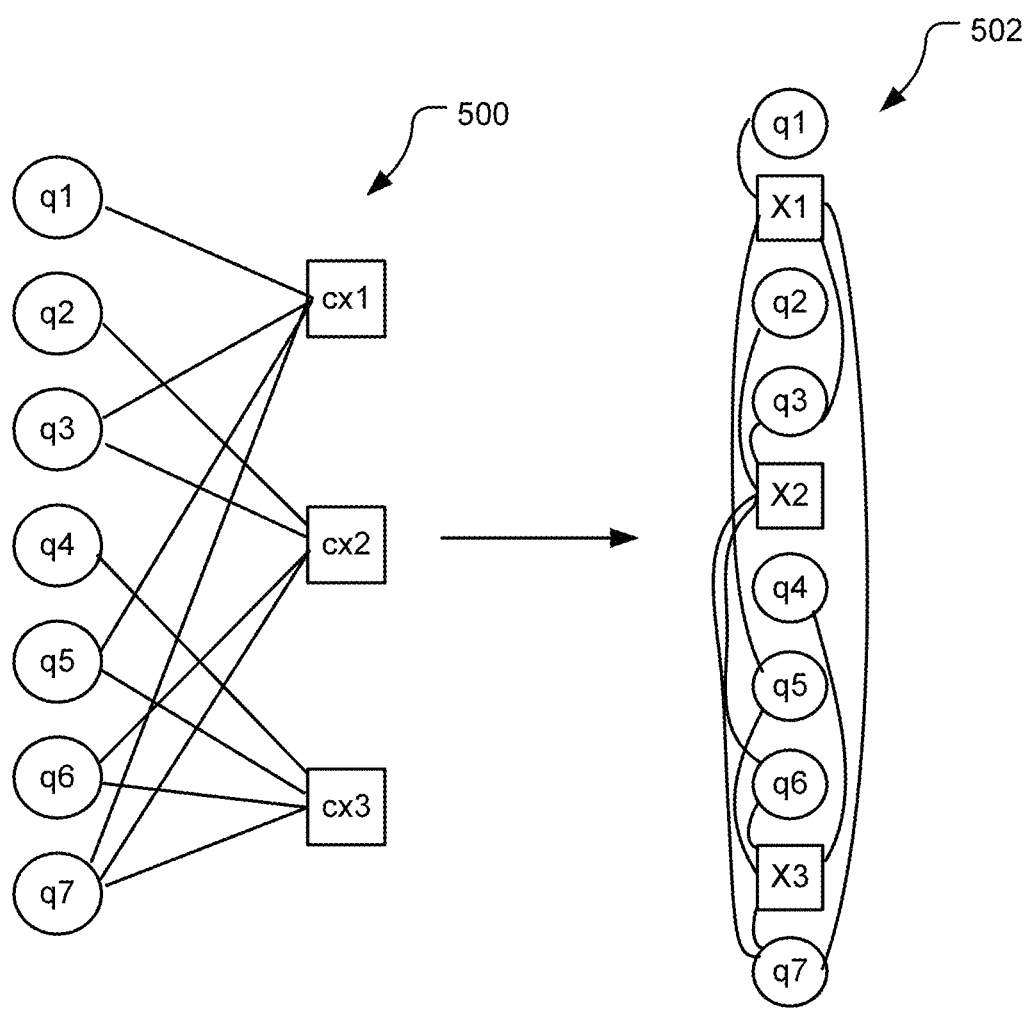
FIG. 5 introduces another exemplary notation for a Tanner graph useful in illustrating a methodology for extracting a syndrome from a fully-connected quantum circuit implementing a hypergraph (HPG) product code.

FIG. 5 introduces another notation for a Tanner graph 500 (as a modified graph 502) useful in illustrating a methodology for extracting a syndrome from a fully-connected quantum circuit implementing a hypergraph (HPG) product code. Hypergraph product codes are derived by taking the product of two different linear codes, and are popular because they achieve a large minimum distance (which translates to a good error correction performance), are defined by low weight checks (which make it easier to measure the syndrome of these codes), and because they offer lower overhead (e.g., many logical qubits can be encoded together in a same data block.

As shown in FIG. 5, the Tanner graph 500 can be visually condensed into a 1D line of data qubits (circles) and check qubits (squares) as shown in modified graph 502. Linear codes of the form shown by the 1D line in the modified graph 502 may be used as the X and Y axis of the graphs shown and discussed below with respect to FIG. 6.

FIG. 6 illustrates an exemplary construction of a product graph 600 representing an HPG code formed by multiplying together two linear CSS codes, shown along the y-axis 602 and x-axis 604 as "Code 1" and "Code 2" respectively. Each of the linear CSS codes consists of multiple check bits (squares) and data bits (circles), using the same notation shown introduced in FIG. 5. For simplicity of illustration, only a subset of the edges within each graph are shown in the y-axis 602 and the x-axis 604. For example, all edge of code one are shown in a first representation 606 but several are redacted for simplicity in a second representation shown along the y-axis 602.

The product graph 600 is created by multiplying the two classical linear codes (Code 1, Code 2) together. Visually, this can be understood by depicting a Tanner graph for Code 1 along the Y-axis and a Tanner graph for Code 2 along the X-axis, as shown. A node multiplication step is performed in which each node on the X-axis is multiplied by each node on the Y-axis according to a particular product definition methodology shown in key 610 of FIG. 6, also described as follows:

- a data bit (circle) multiplied by a data bit (circle) yields a data qubit (circle);
- a check bit (square) multiplied by another check bit (square) yields a data qubit (circle);
- a data bit (circle) multiplied by a check bit (square) yields an X-basis check qubit (sometimes referred to as a "measure-X qubit"0) and
- a check bit (square) multiplied by a data bit (circle) yields a Z-basis check qubit (sometimes referred to as a "measure-Z qubit").

Similar to the multiplicative methodology applied to the check bits and data qubits, the edges of Code 1 and Code 2 are also multiplied across each row and column of the product graph 600. For example, a vertical edge 612 is added at a like-position in every column of the table, while a horizontal edge 614 is added at a like-position in every row of the table. Other edges of the product graph 600 are redacted in FIG. 6 for simplicity and clarity of illustration.

According to one implementation, the coloring methodology discussed above with respect to FIG. 4B can be optionally applied to the product graph 600 to independently measure the X-basis syndrome and the Y-basis syndrome of the HPG code. For example, the z-basis checks and their associated edges may be initially ignored while a coloring scheme is applied to measure the x-basis stabilizers; then, in a similar manner, the x-basis checks and their associated edges are ignored while a coloring scheme is applied to measure the z-basis stabilizers. While this methodology works and yields a shorter syndrome extraction circuit than traditional approaches, a further improvement can be realized by applying a cardinal ordering scheme to the edges (e.g., classifying each edge as north, south, east, or west) and then selectively coloring edges within directional subgroups of the cardinal ordering scheme. This approach, described in detail with respect to FIG. 7, allows the x-stabilizers and the z-stabilizers to be measured simultaneously.

Figure 7A:
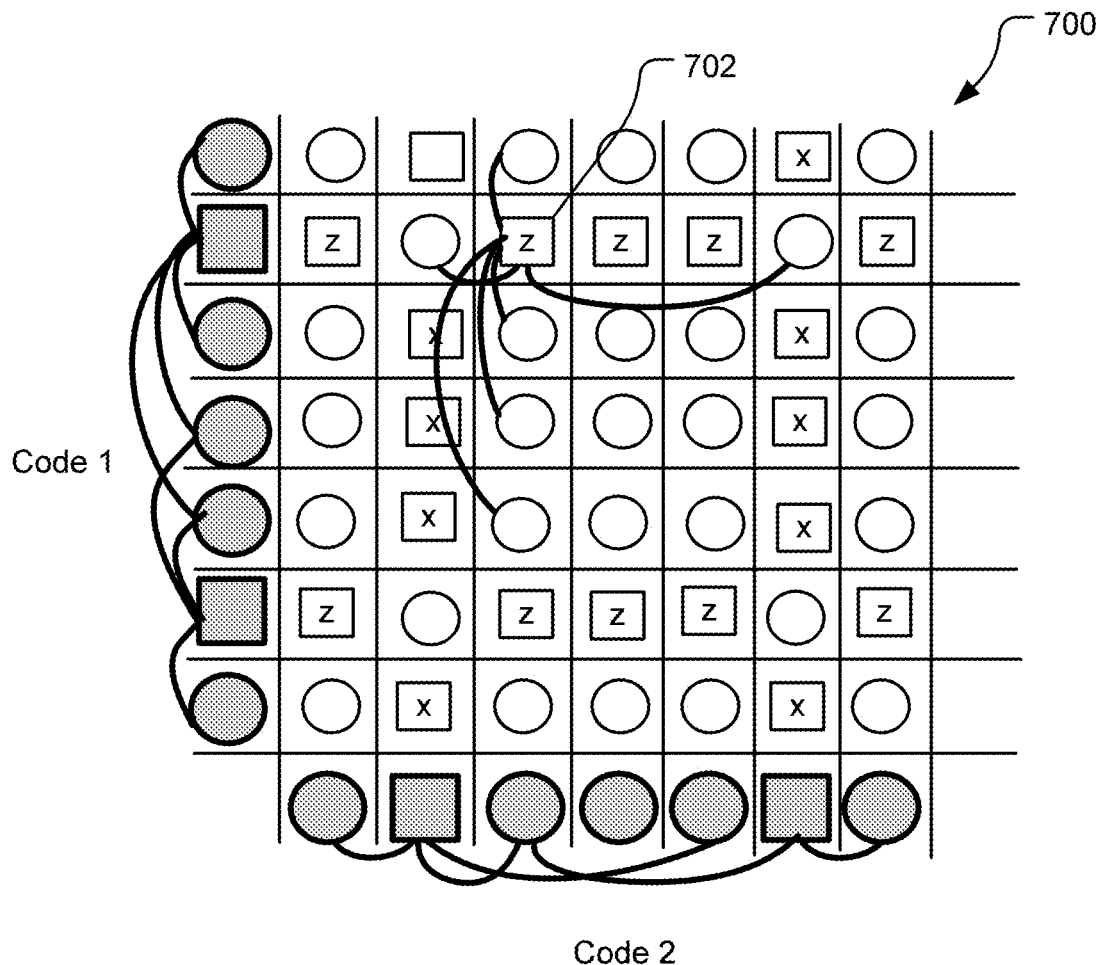
FIG. 7A illustrates an example partial construction of another HPG code product graph that illustrates a method for simultaneously measuring x-stabilizers and z-stabilizers.

FIG. 7A illustrates an example partial construction of another HPG code product graph 700 that illustrates a method for simultaneously measuring x-stabilizers and z-stabilizers. The basic principles of constructing the product graph 700 are similar to those of FIG. 6. Two linear CSS codes—Code 1 and Code 2—are multiplied, as shown in the key 710, to yield a layout of check bits and data bits illustrated in the product graph 700. For conceptual clarity, the product graph 700 omits a majority of the edges that would, in actuality, exist. Although not shown, each edge in Code 1 is to be multiplied across the product graph 700 resulting in a corresponding vertical edge within each column. Likewise, each edge in Code 2 is to be multiplied across the product graph 700, resulting in a corresponding horizontal edge within each row. For simplicity and illustration of concept, the product graph 700 omits the majority of these edges and illustrates only a subset of the total edges forming connections with a Z-check bit 702.

Measurement of each of the stabilizers in the product graph 700 is discussed with respect to FIG. 7B, below, and more particularly—with respect to a substructure including the X-check bit 702 and its associated edges and neighboring data bits.

Figure 7B:
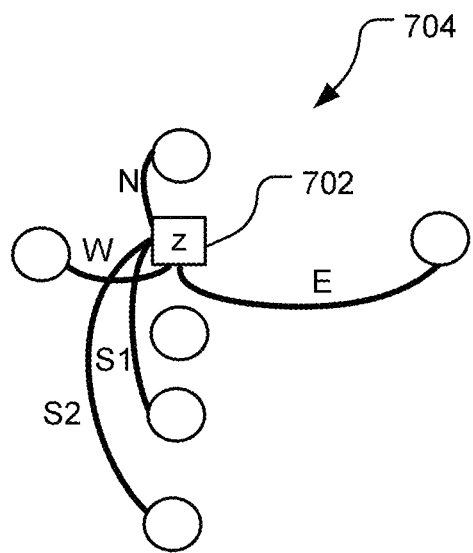
FIG. 7B illustrates subgraph structure of the example HPG code product graph shown in FIG. 7A.

FIG. 7B illustrates a subgraph structure 704 of the example product graph 700. This subgraph structure includes the Z-check bit 702, edges connected to the Z-check bit 702, and associated neighboring data qubits. This structure is useful in explaining further operations for performing simultaneous measurement of x-stabilizers and z-stabilizers in a quantum circuit implementing an HPG code on fully-connected qubits.

Each edge between two nodes on the product graph 700 may be understood as representing a CNOT or equivalent joint measurement. Thus, according to one implementation, measuring the z-stabilizer corresponding to Z-check bit 702 entails the steps of (1) preparing the Z-check bit 702 in an initial state; (2) applying the five CNOTs (corresponding to the five edges); and (3) measuring the Z-check bit 702.

To determine an optimal ordering for such operations with respect to all stabilizer measurements in the product graph 700, a cardinal ordering scheme is used to group edges and prioritize associated qubit operations. In FIG. 7, the individual edges coupled to the Z-check bit 702 bit are labeled based on their cardinal direction within the product graph 700 relative to the Z-check bit. For example, the Z-check bit 702 has one northern edge ("N"), two southern edges ("S1" and "S2"), one eastern edge ("E") and one western edge ("W").

Given a subcircuit consisting of only CNOT gates, we say that the circuit is cardinally ordered if all of the east CNOTs are applied first, followed by the north CNOTs, then the south CNOTs, and lastly, the west CNOTs. The proposition shown in Table 1, below illustrates that this cardinal ordering is sufficient to compute any stabilizer of and HPG graph using a circuit with fully-connected qubits:

TABLE 1

Proposition: Consider a set of m + 1 stabilizer generators $s_1, s_2, \ldots, s_m, s_{m+1}$, for an HGP code with vertices placed at the standard coordinates. Furthermore, consider a subcircuit consisting of the CNOTs used to measure the stabilizers $S_m = s_1, s_2, \ldots, s_m$ collected together in cardinal order, followed by the sequential application of those CNOTs used to measure $s_{m+1}$. Relabeling the time steps at which those CNOTs used for measuring $s_{m+1}$ are applied such that the whole subcircuit is in cardinal order forms an equivalent subcircuit.
Proof. Notice that swapping the order of a pair of non-commuting CNOTs whose support intersects on a single qubit introduces another CNOT between the other two qubits. Suppose, that $s_{m+1}$ is a Z stabilizer generator and that $S_{m'} \subseteq S_m$ is the subset of generators of the X type with support overlapping the support of $s_{m+1}$. Trivially, the CNOTs in $s_{m+1}$ commute with all the CNOTs in $S_m \setminus S_{m'}$. By the hypergraph product construction, the support of each stabilizer generator $s_{i'} \hat{A} \in S_{m'}$ overlaps exactly twice with the support of $s_{m+1}$ in one of four possible configurations; see FIG. 1(a). Depending on the configuration, we need to perform 0 or 2 swaps of the CNOTs in $s_{m+1}$ with non-commuting CNOTs in $s_{i'}$ to bring them into cardinal order. Each such swap introduces a CNOT gate from the stabilizer qubit of $s_{i'}$ to the stabilizer qubit of $s_{m+1}$. As these introduced gates have order two, and commute with all other gates in the, we can reorder them such that they act consecutively and cancel one another. Thus, when reordering $S_m \cup s_{m+1}$, the action of the circuit is preserved. A similar argument applies when $s_{m+1}$ is an X type stabilizer generator.

The proof set forth in Table 1, above, leads to the following transformation, referred to herein as Circuit Transformation 2, which is periodically referred to elsewhere throughout this disclosure:

Circuit Transformation 2: Given a sequential syndrome extraction circuit (SSEC) for a HPG code with vertices placed at standard coordinates (e.g., coordinates corresponding to counterparts in the connectivity graph for the given circuit), an equivalent circuit is obtained by permuting the order of the CNOTs such that they are in cardinal order, as defined above.

Per this methodology, any individual z-stabilizer and x-stabilizer in the product graph of FIG. 7A can be measured using a subcircuit of CNOTs where the CNOTs gates are applied in the cardinal ordering scheme: east, north, south, and west.

The below-described methodology expands on this concept further, allowing the z-stabilizers and the z-stabilizers to be measured simultaneously by assigning a coloring scheme sub-circuit to each different cardinal direction within the above-described cardinally-ordered CNOT circuit. Stated differently, a coloring scheme (similar to that of FIG. 4A-4B) may be applied to edges of a particular cardinal direction when more than one such edge of a given direction exists for any check bit on the product graph 700. An example sequence of operations for implementing this methodology is enumerated below:

1. Prepare all x-basis and z-basis check qubits in the appropriate state during the 0.
2. Partition all edges of the associated HPG code into four subsets: the east, north, south, and west edges (as generally explained and simplified above with respect to a single check bit in FIG. 7B).

3. If there exist two or more edges of a given cardinal direction connected any one of the check bits in the HPG code, assign a coloration scheme to edges of that direction. In the example of FIG. 7B where there exist two south-direction edges S1, S2, the edges S1 and S2 are therefore assigned to different colors (edge types) in a coloring scheme. For example, S1 is a Type 1 south-direction edge and S2 is a Type 2 south-direction edge. Likewise, if there exist multiple edges of the other cardinal direction (N, E, W), those same-direction edges may also be assigned a color scheme. For example, there may exist a Type 1 East-direction edge, a Type 2 east-direction edge, etc.
4. Rearrange the CNOTs in cardinal order by recursive applications of Circuit Transformation 2: Loop through each direction in the cardinal ordering "east, north, south, west," one by one. For each selected direction in this loop, perform step 5, below.
5. Compress the subcircuit of each cardinal direction using Circuit Transformation 1: For each selected direction "D" (N, S, E, W), loop over the colors "C" assigned to one or more edges of the selected direction D, simultaneously applying all CNOTs of color "C" for the selected direction across the entire product graph. For example, a single time-step may entail applying a CNOT to all Type 1 South edges (S1) in the entire product graph 700, then—at a next time-step, applying a CNOT to all Type 2 South edges (S2) in the entire product graph 700.
6. Measure all check qubits in the appropriate basis during the final timestep $\{\tau\}$.

Note, operations (4) and (5) above collectively provide for (1) beginning the CNOTs for each cardinal direction at a different time step and (2) if a coloring scheme exists for a given cardinal direction, performing the CNOTs for the different colors of that cardinal direction at different timesteps.

In other implementations, a subcircuit providing the functionality of the circuit described above (with respect to steps 1-6) includes one or more alternative 2-qubit gates in lieu of each CNOT. For example, the functionality of the "CNOT" gate could be implemented by a control-Z gate or a joint measurement.

In addition to the reductions in depth of the syndrome extraction circuit realized above, still further improvements in depth can be realized for HPG codes by a technique that provides for drawing the product graph for the HPG in according to a construct that seeks to balance edges of each cardinal direction. Specifically, this methodology provides for algorithmic manipulations to the HPG product code graph for a given HPG circuit implementation to ensure that the number of north and south edges extending from each check bit is balanced and to ensure that the number of east and west edges extending from each check bit is balanced.

As used herein, vertical edges are said to be "balanced" for a given bit when the number of north edges extending from the bit is equal to the number of south edges extending from the bit, within +/−1 edge (e.g., the remainder occurring when the number of vertical edges is odd); likewise, horizontal edges are said to be "balanced" for a given bit when the number of east edges extending from the bit is equal to the number of west edges extending from the bit, within +/−1 edge (e.g., the remainder occurring when the number of horizontal edges is odd).

Figure 8:
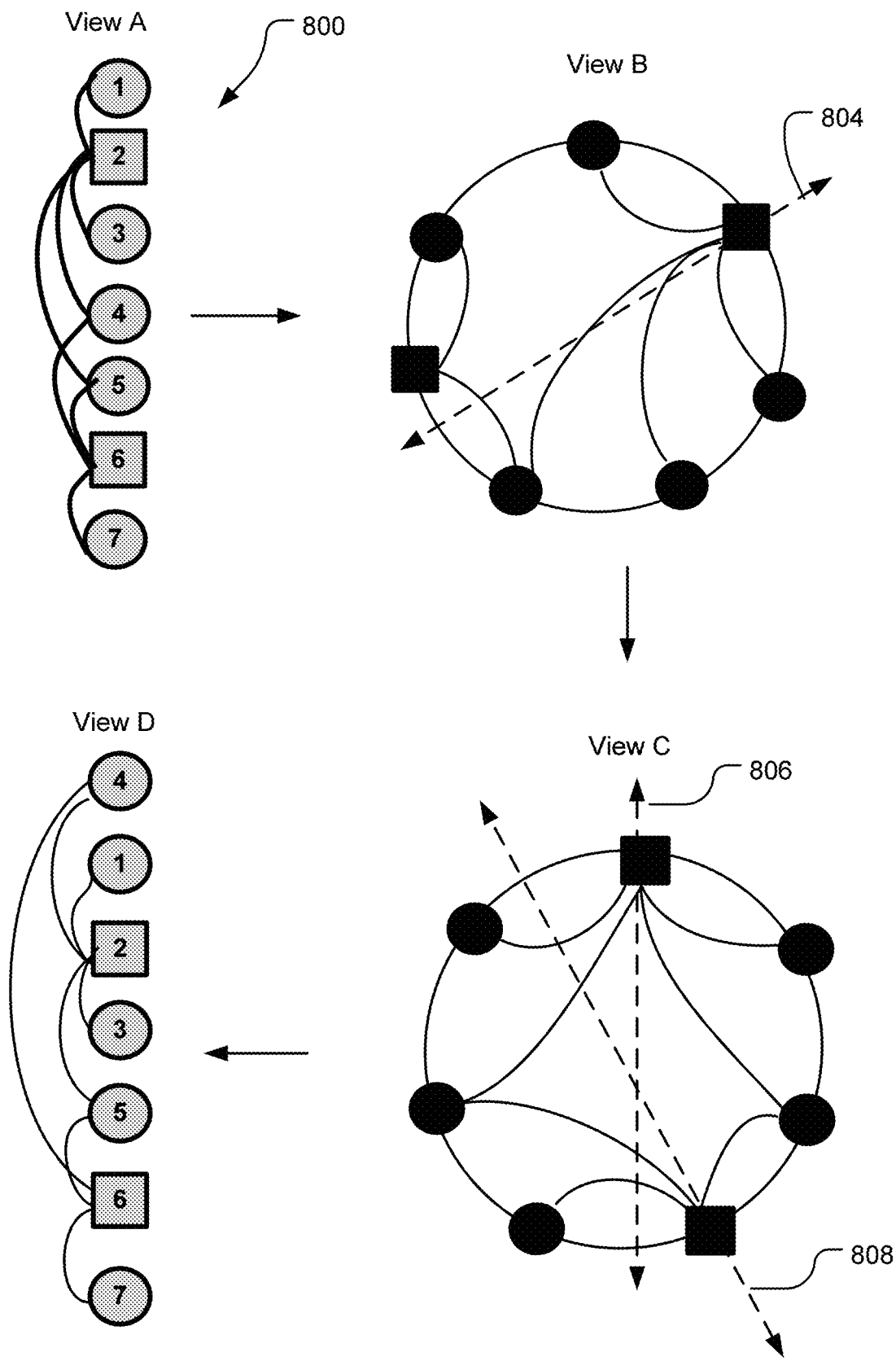
FIG. 8 illustrates an example methodology for re-writing a CSS linear code according to a balanced cardinal ordering scheme that permits a further reduction in depth of an associated syndrome extraction circuit.

FIG. 8 illustrates an example methodology for re-writing a CSS linear code 800 according to a balanced cardinal ordering scheme that permits a further reduction in depth of an associated syndrome extraction circuit.

Referring to View A of FIG. 8, an exemplary CSS linear code 800 is shown. This CSS linear code may, for example, form either of the multipliers (Code 1, Code 2) used to form the HPG codes illustrated with respect to FIGS. 6 and 7. For illustrative purposes, the data bits and check bits of the CSS linear code 800 are shown labeled numerically from top to bottom (1-7). By example and without limitation, the CSS linear code 800 includes two check bits (bit number 2 and number 6) and five data bits (bit numbers 1, 3, 4, 5, and 7). Here, the first check bit (number 2) has four vertical edges, including one north edge extending to bit number 1 and three south edges extending to bit numbers 3, 4, and 5, respectively. Likewise, the second check bit (number 6) has three vertical edges, including two north edges extending to bit numbers 4 and 5 and a south edge extending to bit number 7. The representation of the CSS linear code 800 shown in View A is considered "unbalanced" due to the 1-to-3 ratio of north to south edges on bit number 2.

View B illustrates an alternate depiction of the CSS linear code 800 in which the bits are arranged, in numerical order, around the circumference of a circle. Edges shown in View A are preserved. Since the CSS linear code 800 is presumed to be implemented in a quantum circuit with fully connected qubits, the relative ordering of the bits along this circle can be altered without affecting the code. When an axis 804 is drawn through bit number 2, it can be seen that the edges are "unbalanced" due to the fact that this bit has three edges on one side of the axis 804 and one edge on the other side of the axis 804.

View C illustrates a functionally equivalent but visually different representation of the CSS linear code 800. Between Views B and C, the bits of have been reordered along the circumference of the circle while preserving the edges between each numbered pair of bits. In this alternate representation, an axis 806 drawn through bit number 2 divides the circle in half and thereby illustrates that the four edges of bit number 2 (e.g., extending to the same bits as in Views A and B) are now balanced in the sense that bit number 2 is connected to a same number of edges on each side of the axis 806.

Still referring to the representation of View C, the second check bit (number 6) is also said to be balanced because there exist an odd number of edges that are as balanced as possible (e.g., equal +/−1 edge) on opposite sides of an axis 808 intersecting this bit and dividing the circle in half.

View D illustrates yet another functionally equivalent representation of the CSS linear code 800 that relies on the same bit ordering scheme as that shown in View C. That is, the numerical bits remain arranged relative to one another in a manner that matches that of the bit arrangement along the circle in view C. This representation of the CSS linear code 800 is said to be "balanced."

In sum, although Views A and D illustrate functionally equivalent representations of the CSS linear code 800, the representation of View A provides for an unbalanced cardinal ordering while the representation of View D provides for a balanced cardinal ordering. If the View D representation of the CSS linear code 800 is used generate the product code graph used defining the syndrome extraction circuit (e.g., in a manner the same or similar to that described with respect to FIGS. 6 and 7), the resulting product code graph then has a balanced number of north v. south vertical edges for each check bit and a balanced number of east. V. west horizontal edges.

When the stabilizer circuit described above with respect to FIGS. 7A and 7B is applied to a product graph with a balanced cardinal ordering edge scheme (e.g., generated based on the "View D" representation FIG. 8), the resulting syndrome extraction circuit is of a shorter depth than that employed to extract the syndrome from a product graph generated based on the unbalanced "View A" representation of the same linear code. The aforementioned reduction in depth of the stabilizer circuit for an HPG codes generated based on a balanced cardinal ordering (as described above) is further supported by the proof in Table 2 below:

TABLE 2

Proposition: Consider an HPG code of length N with M stabilizer generators and with vertices placed at the standard coordinates. If $\delta_E$, $\delta_N$, $\delta_S$ and $\delta_W$ are respectively the maximum degrees of the east, north, south and west subgraphs, then Circuit construction 1 uses N + M physical qubits and has depth $\delta_E + \delta_N + \delta_S + \delta_W + 2$.
Proof. A data qubit is assigned to each qubit vertex of the Tanner graph and a readout qubit is assigned to each stabilizer vertex of the Tanner graph leading to a total of N + M physical qubits. Furthermore, the adjacency graph $G(C_E)$ of the east subcircuit $C_E$ is isomorphic to the east subgraph of the Tanner graph. Thus, $G(C_E)$ has chromatic number $\delta_E$. The same holds for the three other directions. Two additional time steps are required to apply the necessary state preparations and measurements leading to a depth of $\delta_E + \delta_N + \delta_S + \delta_W + 2$.

The proposition and the accompanying proof in Table 2, above, establishes that the number of time-steps in the stabilizer circuit for a fully connected HPC code is given by the relation $\delta+2$ where $\delta$ is the sum of the number of edges in each of the four cardinal directions in the associated product code graph (e.g., $\delta=\delta_E+\delta_N+\delta_S+\delta_W$).

According to one implementation, algorithmic processing is utilized to identify a balanced cardinal edge ordering scheme for any linear code prior to generation of the product code graph and/or to the implementation of the product code in a quantum architecture.

Figure 9:
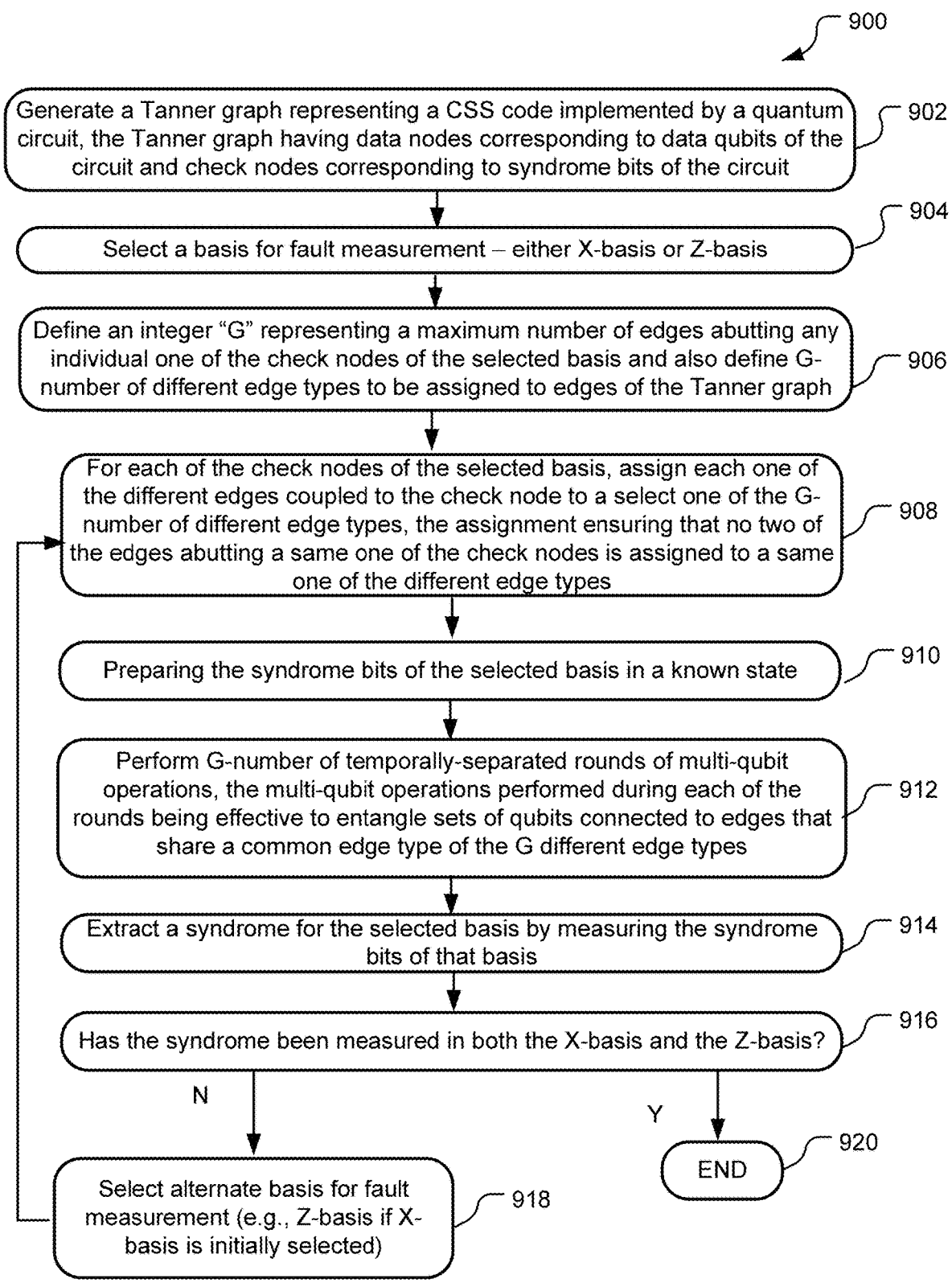
FIG. 9 illustrates example operations for measuring a syndrome in a quantum circuit with fully connected qubits implementing a CSS stabilizer code.

FIG. 9 illustrates example operations 900 for measuring a syndrome in a quantum circuit with fully connected qubits implementing a CSS stabilizer code. A graph generation operation 902 generates a Tanner graph representing the CSS code implemented and includes check nodes corresponding to the syndrome qubits (also referred to herein as check qubits) of the quantum circuit and data nodes corresponding to data qubits of the circuit.

A selection operation 904 selects either the X-basis or the Z-basis for fault measurement. A defining operation 906 defines an integer "G" as the maximum number of edges abutting any one of the check nodes of the selected basis and defines G-number of different edge types. The defining operation 906 further defines G number of different edge types to be assigned to the edges of the Tanner graph.

For each of the check nodes of the selected basis, an assignment operation 908 assigns the different edges coupled to the check node to a select one of the G-number of different edge types. This assignment of edges to edge types is performed in accordance with a constraint requiring that no two of the edges abutting a same one of the check nodes is assigned to a same one of the G different edge types.

A preparation operation 910 prepares the syndrome bits of the selected basis (e.g., X-basis syndrome bits or Z-basis syndrome bits) in a known state. The preparation operation 910 is, for example, performed by a controller than generates and transmits a control signal to the quantum circuit.

A qubit manipulation operations 912 performs G-number of temporally-separated rounds of multi-qubit operations. Each of the G-number of temporally-separated rounds is associated with a different one of the G-number of edge types, and the set of multi-qubit operations performed during each of the temporally-separated round entangles of sets of qubits connected to edges assigned to the edge type associated with that round.

A syndrome extraction operation 914 extract a syndrome for the selected basis by measuring the syndrome bits of that basis (e.g., measuring all X-basis syndrome bits). A determination operation 916 determines whether an alternate fault basis remains to be measured to complete the syndrome measurement. If, for example, the X-basis is measured first, the syndrome measurement next entails similar measurements in the Z-basis. In this case, a selection operation 918 selects the alternate fault basis as the new basis for fault measurement and the operations 908-916 are repeated with respect to the newly-selected basis for fault measurement.

According to one implementation, the operations 900 provide for extraction of the X-basis syndrome in 2+G measurement rounds and extraction of the Z-basis syndrome in another 2+G measurement rounds. This result holds true regardless of the CSS code implemented by the quantum architecture.

Figure 10:
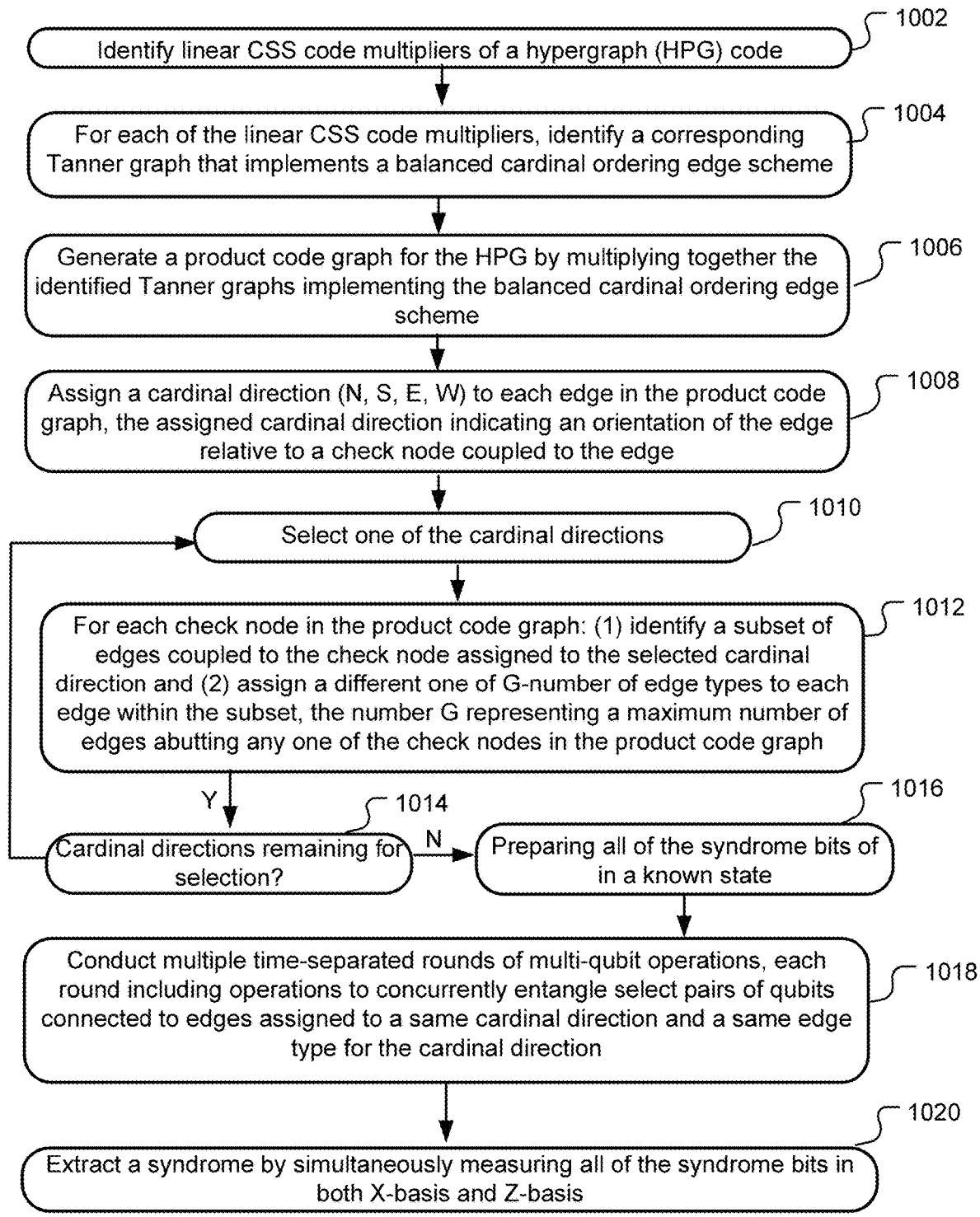
FIG. 10 illustrates example operations for measuring a syndrome in a quantum circuit with fully connected qubits implementing an HPG code.

FIG. 10 illustrates example operations 1000 for measuring a syndrome in a quantum circuit with fully connected qubits implementing an HPG code that is formed by multiplying two linear CSS codes together. An identification operation 1002 identifies the two linear code multipliers of the HPG code.

A cardinal ordering operation 1004 identifies, for each of the two linear CSS codes, a corresponding Tanner graph representation o the code that implements a balanced cardinal ordering edge scheme. The balanced cardinal ordering edge scheme is one that provides a balanced number of edges extending in opposing directions from each of the check nodes in the Tanner graph, as generally defined and discussed above with respect to FIG. 8.

A product code graph generation operation 1006 generates a product code for the HPG by multiplying together the two Tanner graphs identified by the cardinal ordering operation. This linear code multiplication is, for example, achieved by performing operations consistent with those shown and described with respect to FIG. 6.

A cardinal direction assignment operation 1008 assigns a cardinal direction (e.g., N, S, E, W) to each edge in the product code graph such that the assigned cardinal direction indicates an orientation of the edge relative to a check node forming an endpoint of the edge.

A selection operation 1010 selects one of the cardinal directions. As is explained below, the operations 1010 is looped through four times—one time with respect to each of the four cardinal directions. According to one implementation, the selection of such cardinal operations is performed in the order: East, North, South, West (note: this ordering is consistent with the proposition and proof provided above in Table 1).

An identification and assignment operation 1012 performs assignment operations with respect to each check node in the product code graph. Specifically, for each check node in the product code graph, the identification and assignment operation 1012 (1) identifies a subset of edges coupled to the check node that are assigned to the currently-selected cardinal direction; and (2) assigns a different one of up to G-number of edge types to each edge within the identified subset of edges. At the conclusion of the identification and assignment operation 1012, all edges in the product code graph of the currently-selected cardinal direction are assigned to one of the G-number of edge types. Here, "G" may be defined as the maximum number of edges abutting any check node in the product code graph.

A determination operation 1014 determines whether any of the four cardinal directions remains to be selected by selection operation 1010. If so, the loop comprising 1010, 1012 is repeated until all four cardinal directions have been selected and edges associated with such directions have each been assigned to one of the G-number of different edge types.

A syndrome bit preparation operation 1016 next prepares all of the syndrome bits in a known state. A qubit manipulation operation 1018 conducts multiple time-separated rounds of multi-qubit operations, each round including operations to concurrently entangle select pairs of qubits (e.g., CNOT operations), where each pair being entangled in the same round is connected to an edge assigned to a same cardinal direction and a same edge type for the cardinal direction. Stated differently, the qubit manipulation operation 1018 performs a number of time-separated rounds of concurrent entanglement operations that equals a sum of $\delta_E$ (the number of different edge types assigned to east-direction edges), $\delta_N$ (the number of different edge types assigned to north-direction edges), $\delta_S$, (the number of different edge types assigned to south-direction edges), and $\delta_W$ (the number of different edge types assigned to west-direction edges).

A syndrome extraction operation 1020 extracts the syndrome from the quantum circuit by simultaneously measuring all of the syndrome bits in both the X-basis and the X-basis.

According to one implementation, the operations 900 provide for extraction of the entire syndrome (in both X-basis and X-basis) in 2+δ measurement rounds, wherein $\delta=\delta_N+\delta_S+\delta_E+\delta_W$. This constant depth syndrome extraction is achievable regardless of the linear codes used to generate the HPG code.

Figure 11:
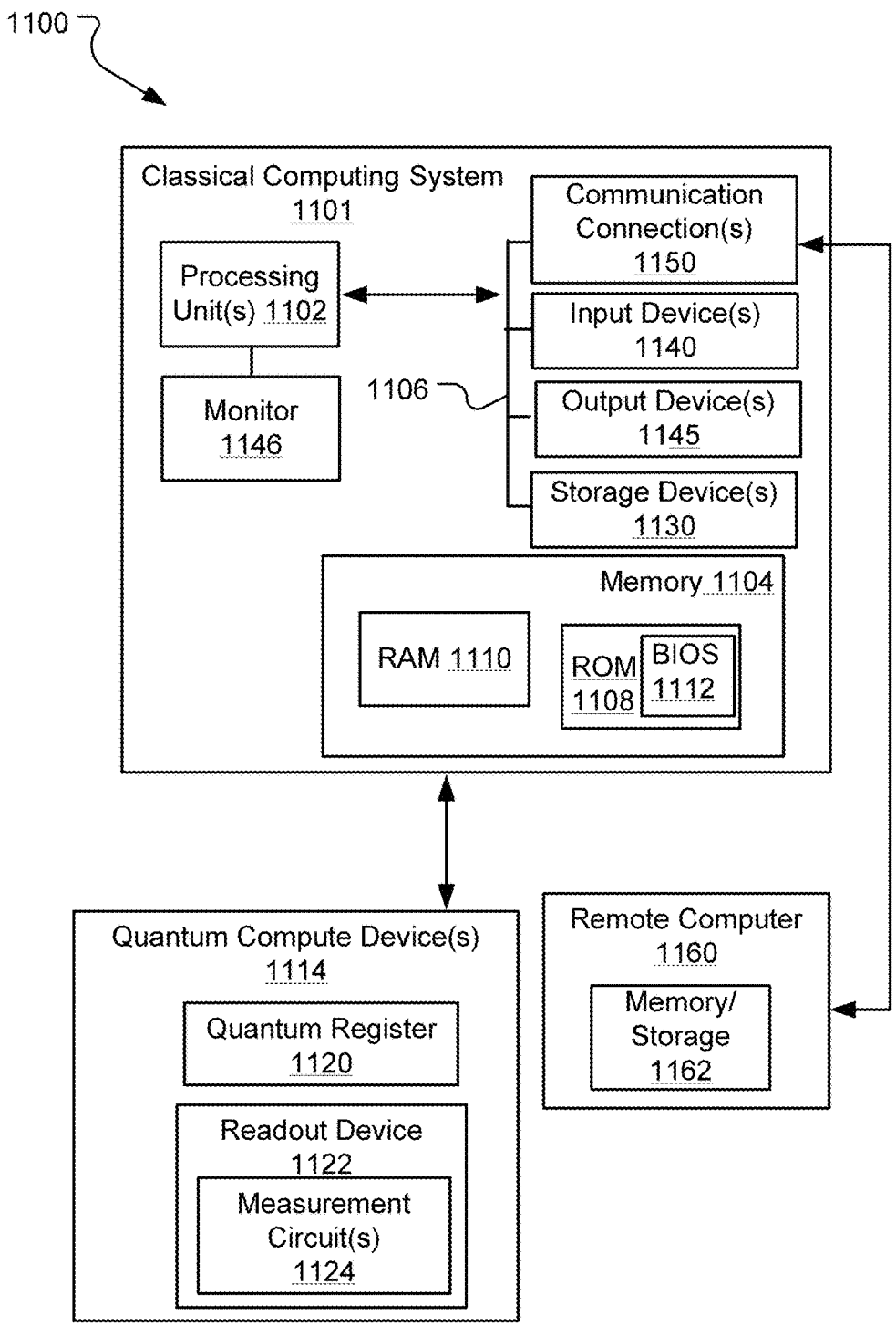
FIG. 11 illustrates an exemplary computing environment suitable for implementing aspects of the disclosed technology.

FIG. 11 illustrates an exemplary computing environment 1100 suitable for implementing aspects of the disclosed technology. This figure and the following discussion are intended to provide a brief, general description of an exemplary computing environment in which the disclosed technology may be implemented. Although not required, the disclosed technology is described in the general context of computer executable instructions, such as program modules, being executed by a personal computer (PC). Generally, program modules include routines, programs, objects, components, data structures, etc., that perform particular tasks or implement particular abstract data types. Moreover, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

The computing environment 1100 of FIG. 11 includes a classical computing environment 1101 (e.g., a PC) coupled to one or more quantum compute device(s) 1114. The quantum compute devices 1114 includes at least a quantum register 1120 and a readout device 1122 including quantum hardware implementing measurement circuits 1124. Aspects of the quantum compute devices 1114 may be controlled by hardware and software elements of the classical computing system 1101.

In one implementation, the classical computing system 1101 includes one or more processing units 1102, a system memory 1104, and a system bus 1106 that couples various system components including the system memory 1104 to the one or more processing units 1102. The system bus 1106 may be any of several types of bus structures including a memory bus or memory controller, a peripheral bus, and a local bus using any of a variety of bus architectures. The exemplary system memory 1104 includes read only memory (ROM) 1108 and random access memory (RAM) 1110. A basic input/output system (BIOS) 1112, containing the basic routines that help with the transfer of information between elements within the classical computing system 1101 is stored in the ROM 1108.

In one implementation, the system memory 1104 stores short-depth syndrome extraction logic 120 of FIG. 1 and also stores decoding logic for detecting and correcting errors in measurement data using syndromes extracted by executing the short-depth syndrome extraction logic.

The classical computing system 1101 further includes one or more storage devices 1130 such as a hard disk drive for reading from and writing to a hard disk, a magnetic disk drive for reading from or writing to a removable magnetic disk, and an optical disk drive for reading from or writing to a removable optical disk (such as a CD-ROM or other optical media). Such storage devices can be connected to the system bus 1106 by a hard disk drive interface, a magnetic disk drive interface, and an optical drive interface, respectively. The drives and their associated computer readable media provide nonvolatile storage of computer-readable instructions, data structures, program modules, and other data for the classical computing system 1101. Other types of computer-readable media which can store data that is accessible by a PC, such as magnetic cassettes, flash memory cards, digital video disks, CDs, DVDs, RAMs, ROMs, and the like, may also be used in the exemplary operating environment.

A number of program modules may be stored in the storage devices 1130 including an operating system, one or more application programs, other program modules, and program data. A user may enter commands and information into the classical computing system 1101 through one or more input devices 1140 such as a keyboard and a pointing device such as a mouse. Other input devices may include a digital camera, microphone, joystick, game pad, satellite dish, scanner, or the like. These and other input devices are often connected to the one or more processing units 1102 through a serial port interface that is coupled to the system bus 1106, but may be connected by other interfaces such as a parallel port, game port, or universal serial bus (USB). A monitor 1146 or other type of display device is also connected to the system bus 1106 via an interface, such as a video adapter. Other peripheral output devices 1145, such as speakers and printers (not shown), may be included.

The classical computing system 1101 may operate in a networked environment using logical connections to one or more remote computers, such as a remote computer 1160. In some examples, one or more network or communication connections 1150 are included. The remote computer 1160 may be another PC, a server, a router, a network PC, or a peer device or other common network node, and typically includes many or all of the elements described above, although only a memory storage device 1162 has been illustrated in FIG. 11. The classical computing system 1101 and/or the remote computer 1160 can be connected to a logical a local area network (LAN) and a wide area network (WAN). Such networking environments are commonplace in offices, enterprise wide computer networks, intranets, and the Internet.

When used in a LAN networking environment, the classical computing system 1101 is connected to the LAN through a network interface. When used in a WAN networking environment, the classical computing system 1101 typically includes a modem or other means for establishing communications over the WAN, such as the Internet. In a networked environment, program modules depicted relative to the classical computing system 1101, or portions thereof, may be stored in the remote memory storage device or other locations on the LAN or WAN. The network connections shown are exemplary, and other means of establishing a communications link between the computers may be used.

The classical computing system 1101 may include a variety of tangible computer-readable storage media and intangible computer-readable communication signals. Tangible computer-readable storage can be embodied by any available media that can be accessed by the classical computing system 1101 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the classical computing system 1101. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

An example method for extracting a syndrome from a quantum measurement circuit includes generating a graph representing a code implemented by the quantum measurement circuit. The graph includes bit nodes corresponding to the data qubits in the quantum measurement circuit, check nodes corresponding to the syndrome qubits in the quantum measurement circuit, and edges between the bit nodes and check nodes each being associated with a stabilizer measurement provided by the code. The method further provides for assigning each of the edges in the graph to a select one of G-number of different edge types and performing at least G-number of temporally-separated rounds of multi-qubit operations, each of the temporally-separated rounds of multi-qubit operations enacting concurrent multi-qubit operations on endpoints of a subset of the edges assigned to a same one of the G different edge types.

In yet another example method of any preceding method, the method provides for concurrent measurement of multiple stabilizers.

In still another example method of any preceding method, assigning each of the edges in the graph to a select one of the G number of the different edge types further comprises ensuring that no two of the edges abutting a same one of the check nodes or a same one of the qubit nodes is assigned to a same one of the G different edge types, the number G representing a maximum number of edges abutting any individual one of the check nodes and bit nodes in the graph.

In still another example method of any preceding method, the code is a hypergraph product code and assigning each of the edges in the graph to a select one of the G number of the different edge types further comprises assigning a cardinal direction to each edge in the graph based on an orientation of the edge within the graph relative to a check node coupled to the edge. For each one of the check nodes, the method further provides for identifying one or more same-directional subsets of edges coupled to the node, each one of the same-directional subsets of the edges including edges coupled to the check node and assigned to a same one of the cardinal directions. A different one of the G number of edge types is then assigned to each edge within each one of the identified same-directional subsets of edges coupled to each of the check nodes.

In another example method of any preceding method, performing the at least G-number of temporally-separated rounds of qubit operations further comprises conducting multiple time-separated rounds of multi-qubit operations, and simultaneously measuring the syndrome bits in the quantum measurement circuit to extract the syndrome simultaneously with respect to both x-basis check qubit and z-basis check qubits. Each round of the multi-qubit operations includes operations to concurrently entangle select pairs of qubits connected to edges assigned to a same cardinal direction and a same edge type.

In yet still another example method of any preceding method, generating the graph further comprises balancing a number of the edges coupled to each individual one of the check nodes that are associated with north and south directions of the cardinal directions, and balancing a number of the edges coupled to each individual one of the check nodes that are associated with east and west directions of the cardinal directions.

In another example method of any preceding method, the concurrent multi-qubit operations performed during each of the temporally-separated rounds include multiple CNOT operations, each of the CNOT operations within a same one of the temporally-separated rounds being effective to entangle pairs of qubits connected via a same edge type in the graph.

In yet another example method of any preceding method, performing the at least G-number of temporally-separated rounds of qubit operation further comprises: preparing the syndrome bits in a known state and performing G number of temporally-separated rounds of multi-qubit operations. The multi-qubit operations performed during each of the rounds being effective to entangle sets of qubits connected to edges that share a common edge type of the G different edge types. Finally, the method provides for extracting the syndrome by measuring the syndrome bits.

In still another example method of any preceding method, the qubits are fully connected in the quantum measurement circuit.

An example quantum system includes a quantum measurement circuit with data qubits and syndrome qubits. The system includes a means for generating a graph representing a code implemented by the quantum measurement circuit. The graph includes bit nodes corresponding to data qubits of the quantum measurement circuit, check nodes corresponding to the syndrome qubits of the quantum measurement circuit, and edges between the bit nodes and check nodes each being associated with a stabilizer measurement provided by the code. The system further includes a means for assigning each of the edges in the graph to a select one of G-number of different edge types, and a means for performing at least G-number of temporally-separated rounds of multi-qubit operations, each of the temporally-separated rounds of multi-qubit operations enacting concurrent multi-qubit operations on endpoints of a subset of the edges assigned to a same one of the G different edge types.

An example system disclosed herein includes a controller and a quantum measurement circuit implementing an error correction code and including data qubits and syndrome qubits. The controller is configured to generate a graph representing a code implemented by the quantum measurement circuit, where the graph includes bit nodes corresponding to the data qubits, check nodes corresponding to the syndrome qubits, and edges between the bit nodes and check nodes each being associated with a stabilizer measurement provided by the code. The controller is further configured to assign each of the edges in the graph to a select one of "G" number of different edge types and to extract a syndrome from the quantum measurement circuit via a methodology that includes performing at least G-number of temporally-separated rounds of multi-qubit operations, each of the temporally-separated rounds of multi-qubit operations enacting concurrent multi-qubit operations on endpoints of a subset of the edges assigned to a same one of the G different edge types.

In another example system of any preceding system, extracting the syndrome includes concurrently measuring multiple stabilizers of the error correction code.

In yet still another example system of any preceding system, assigning each of the edges in the graph to a select one of the G number of the different edge types further comprises ensuring that no two of the edges abutting a same one of the check nodes is assigned to a same one of the G different edge types, where the number G represents a maximum number of edges abutting any individual one of the check nodes and bit nodes in the graph.

In still another example system of any preceding system, the code is a hypergraph product code and assigning each of the edges in the graph to a select one of the G number of the different edge types further comprises assigning a cardinal direction to each edge in the graph based on an orientation of the edge within the graph relative to a check node coupled to the edge. For each one of the check nodes, the controller is configured to identify one or more same-directional subsets of edges coupled to the node, each of the same-directional subsets of the edges including edges coupled to the check node and assigned to a same one of the cardinal directions. The controller assigns a different one of the G number of edge types to each edge within each one of the identified same-directional subsets of edges coupled to each of the check nodes.

In another example system of any preceding system, performing the at least G-number of temporally-separated rounds of multi-qubit operations further comprises conducting one or more time-separated rounds of multi-qubit operations and simultaneously measuring the syndrome bits in the quantum measurement circuit to extract the syndrome simultaneously with respect to both x-basis check qubit and z-basis check qubits. Each round of the multi-qubit operations includes operations to concurrently entangle select pairs of qubits connected to edges assigned to a same cardinal direction and a same edge type.

In yet another example system of any preceding system, generating the graph further comprises balancing a number of the edges coupled to each individual one of the check nodes that are associated with north and south directions of the cardinal directions and balancing a number of the edges coupled to each individual one of the check nodes that are associated with east and west directions of the cardinal directions.

In yet still another example system of any preceding system, the concurrent multi-qubit operations performed during each of the temporally-separated rounds include multiple CNOT operations, each of the CNOT operations within a same one of the temporally-separated rounds being effective to entangle pairs of qubits connected via a same edge type in the graph.

In still another example system of any preceding system, performing the at least G-number of temporally-separated rounds of multi-qubit operations further comprises preparing the syndrome bits in a known state and performing the G number of temporally-separated rounds of multi-qubit operations after preparing the syndrome bits in the known state. The multi-qubit operations performed during each of the rounds is effective to entangle sets of qubits connected to edges that share a common edge type of the G different edge types. The controller is configured to extract the syndrome from the quantum measurement circuit by measuring the syndrome bits.

In still yet another example system of any preceding system, the qubits are fully connected in the quantum measurement circuit.

An example computer-readable storage media disclosed herein encodes computer-executable instructions for executing a computer process to extract a syndrome from a quantum measurement circuit. The computer process comprises generating a graph representing a code implemented by the quantum measurement circuit, the graph including bit nodes corresponding to data qubits in the quantum measurement circuit, check nodes corresponding to syndrome qubits in the quantum measurement circuit, and edges between the bit nodes and check nodes each being associated with a stabilizer measurement provided by the code. The computer process further comprises assigning each of the edges in the graph to a select one of G number of different edge types and performing at least G-number of temporally-separated rounds of qubit operations. Each of the temporally-separated rounds of qubit operations enacts concurrent multi-qubit operations on endpoints of a subset of the edges assigned to a same one of the G different edge types.

In another example tangible computer-readable storage media disclosed herein, the encoded computer process provides for concurrent measurement of multiple stabilizers.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendix, provide a complete description of the structure and use of exemplary implementations.

The above specification, examples, together with the attached appendix provide a complete description of the structure and use of exemplary implementations. Since many implementations can be made without departing from the spirit and scope of the claimed invention, the claims hereinafter appended define the invention. Furthermore, structural features of the different examples may be combined in yet another implementation without departing from the recited claims. The above specification, examples, and data provide a complete description of the structure and use of exemplary implementations. Since many implementations can be made without departing from the spirit and scope of the claimed invention, the claims hereinafter appended define the invention. Furthermore, structural features of the different examples may be combined in yet another implementation without departing from the recited claims.

What is claimed is:

1. A method for extracting a syndrome from a quantum measurement circuit, the quantum measurement circuit including data qubits and syndrome qubits;
   generating, by a processor, a graph representing a code implemented by the quantum measurement circuit, the graph including bit nodes corresponding to the data qubits, check nodes corresponding to the syndrome qubits, and edges between the bit nodes and check nodes each being associated with a stabilizer measurement provided by the code;
   assigning, by the processor, each of the edges in the graph to a select one of G-number of different edge types while ensuring that no two of the edges abutting a same one of the check nodes or a same one of the qubit nodes is assigned to a same one of the G-number of different edge types; and
   extracting the syndrome, at a quantum circuit, the extracting including:
   performing at least G-number of temporally-separated rounds of multi-qubit operations, each of the temporally-separated rounds of multi-qubit operations enacting concurrent multi-qubit operations to entangle pairs of qubits located on endpoints of a subset of the edges assigned to a same one of the G-number of different edge types without concurrently performing any multi-quit operations that act on a same qubit.

2. The method of claim 1, wherein the method provides for concurrent measurement of multiple stabilizers.

3. The method of claim 1, wherein assigning each of the edges in the graph to a select one of the G-number of the different edge types further comprises:
   ensuring that no two of the edges abutting a same one of the check nodes or a same one of the qubit nodes is assigned to a same one of the G-number of different edge types, the number G representing a maximum number of edges abutting any individual one of the check nodes and bit nodes in the graph.

4. The method of claim 1, wherein the code is a hypergraph product code and assigning each of the edges in the graph to a select one of the G-number of the different edge types further comprises:
   assigning a cardinal direction to each edge in the graph based on an orientation of the edge within the graph relative to a check node coupled to the edge;
   for each one of the check nodes, identifying one or more same-directional subsets of edges coupled to the node, each same-directional subset of the edges including edges coupled to the check node and assigned to a same one of the cardinal directions;
   assigning a different one of the G-number of edge types to each edge within each one of the identified same-directional subsets of edges coupled to each of the check nodes.

5. The method of claim 4, wherein performing the at least G-number of temporally-separated rounds of qubit operations further comprises:
   conducting multiple time-separated rounds of multi-qubit operations, each round including operations to concurrently entangle select pairs of qubits connected to edges assigned to a same cardinal direction and a same edge type;
   simultaneously measuring the syndrome bits in the quantum measurement circuit to extract the syndrome simultaneously with respect to both x-basis check qubit and z-basis check qubits.

6. The method of claim 4, wherein generating the graph further comprises:
   balancing a number of the edges coupled to each individual one of the check nodes that are associated with north and south directions of the cardinal directions; and
   balancing a number of the edges coupled to each individual one of the check nodes that are associated with east and west directions of the cardinal directions.

7. The method of claim 1, wherein the concurrent multi-qubit operations performed during each of the temporally-separated rounds include multiple controlled-NOT (CNOT) operations, each of the CNOT operations within a same one of the temporally-separated rounds being effective to entangle pairs of qubits connected via a same edge type in the graph.

8. The method of claim 1, wherein performing the at least G-number of temporally-separated rounds of qubit operation further comprises:
   preparing the syndrome bits in a known state;
   after preparing the syndrome bits in the known state, performing the G-number of temporally-separated rounds of multi-qubit operations, the multi-qubit operations performed during each of the rounds being effective to entangle sets of qubits connected to edges that share a common edge type of the G different edge types; and
   extracting the syndrome by measuring the syndrome bits.

9. The method of claim 1, wherein the qubits are fully connected in the quantum measurement circuit.

10. A system comprising:
    a quantum measurement circuit implementing an error correction code and including data qubits and syndrome qubits;
    a controller configured to:

generate, by a processor, a graph representing a code implemented by the quantum measurement circuit, the graph including bit nodes corresponding to the data qubits, check nodes corresponding to the syndrome qubits, and edges between the bit nodes and check nodes each being associated with a stabilizer measurement provided by the code;

assign, by the processor, each of the edges in the graph to a select one of "G" number of different edge types while ensuring that no two of the edges abutting a same one of the check nodes or a same one of the qubit nodes is assigned to a same one of the G-number of different edge types; and extracting a syndrome from the quantum measurement circuit via a methodology that includes performing at least the G-number of temporally-separated rounds of multi-qubit operations, each of the temporally-separated rounds of multi-qubit operations enacting concurrent multi-qubit operations to entangle pairs of qubits located on endpoints of a subset of the edges assigned to a same one of the G-number of different edge types without concurrently performing any multi-quit operations that act on a same qubit.

11. The system of claim 10, wherein extracting the syndrome includes concurrently measuring multiple stabilizers of the error correction code.

12. The system of claim 10, wherein assigning each of the edges in the graph to a select one of the G-number of the different edge types further comprises:

ensuring that no two of the edges abutting a same one of the check nodes is assigned to a same one of the G-number of different edge types, the number G representing a maximum number of edges abutting any individual one of the check nodes and bit nodes in the graph.

13. The system of claim 10, wherein the code is a hypergraph product code and assigning each of the edges in the graph to a select one of the G-number of the different edge types further comprises:

assigning a cardinal direction to each edge in the graph based on an orientation of the edge within the graph relative to a check node coupled to the edge;

for each one of the check nodes, identifying one or more same-directional subsets of edges coupled to the node, each same-directional subset of the edges including edges coupled to the check node and assigned to a same one of the cardinal directions;

assigning a different one of the G-number of edge types to each edge within each one of the identified same-directional subsets of edges coupled to each of the check nodes.

14. The system of claim 13, wherein performing the at least G-number of temporally-separated rounds of multi-qubit operations further comprises:

conducting one or more time-separated rounds of multi-qubit operations, each round including operations to concurrently entangle select pairs of qubits connected to edges assigned to a same cardinal direction and a same edge type;

simultaneously measuring the syndrome bits in the quantum measurement circuit to extract the syndrome simultaneously with respect to both x-basis check qubit and z-basis check qubits.

15. The system of claim 13, wherein generating the graph further comprises:

balancing a number of the edges coupled to each individual one of the check nodes that are associated with north and south directions of the cardinal directions; and balancing a number of the edges coupled to each individual one of the check nodes that are associated with east and west directions of the cardinal directions.

16. The system of claim 10, wherein the concurrent multi-qubit operations performed during each of the temporally-separated rounds include multiple controlled NOT (CNOT) operations, each of the CNOT operations within a same one of the temporally-separated rounds being effective to entangle pairs of qubits connected via a same edge type in the graph.

17. The system of claim 10, wherein performing the at least G-number of temporally-separated rounds of multi-qubit operations further comprises:

preparing the syndrome bits in a known state;

after preparing the syndrome bits in the known state, performing the G number of temporally-separated rounds of multi-qubit operations, the multi-qubit operations performed during each of the rounds being effective to entangle sets of qubits connected to edges that share a common edge type of the G-number of different edge types; and extracting the syndrome by measuring the syndrome bits.

18. The system of claim 10, wherein the qubits are fully connected in the quantum measurement circuit.

19. One or more tangible computer-readable storage media encoding processor-executable instructions for executing a computer process to extract a syndrome from a quantum measurement circuit, the quantum measurement circuit including data qubits and syndrome qubits, the computer process comprising:

generating a graph representing a code implemented by the quantum measurement circuit, the graph including bit nodes corresponding to the data qubits, check nodes corresponding to the syndrome qubits, and edges between the bit nodes and check nodes each being associated with a stabilizer measurement provided by the code;

assigning each of the edges in the graph to a select one of G-number of different edge types while ensuring that no two of the edges abutting a same one of the check nodes or a same one of the qubit nodes is assigned to a same one of the G-number of different edge types;

instructing a quantum circuit to extract the syndrome by performing at least G-number of temporally-separated rounds of qubit operations, each of the temporally-separated rounds of qubit operations enacting concurrent multi-qubit operations on endpoints of a subset of the edges assigned to a same one of the G different edge types without concurrently performing any multi-quit operations that act on a same qubit.

20. The one or more tangible computer-readable storage media of claim 19, wherein the computer process provides for concurrent measurement of multiple stabilizers.

* * * * *